(12) United States Patent
Fellner et al.

(10) Patent No.: US 12,209,600 B2
(45) Date of Patent: Jan. 28, 2025

(54) ASSEMBLY FOR A FLUID-FILLED PISTON-CYLINDER UNIT AND FLUID-FILLED PISTON-CYLINDER UNIT HAVING AN ASSEMBLY OF THIS TYPE

(71) Applicant: SUSPA GmbH, Altdorf (DE)

(72) Inventors: Ludwig Fellner, Altdorf (DE); Manfred Hofmann, Hettstadt (DE); Roland Löscher, Tennenlohe (DE); Florian Stephan, Herzogenaurach (DE); Wolfgang Nagl, Allersberg (DE); Victor Limpert, Rednitzhembach (DE)

(73) Assignee: SUSPA GMBH, Altdorf (DE)

( * ) Notice: Subject to any disclaimer, the term of this patent is extended or adjusted under 35 U.S.C. 154(b) by 0 days.

(21) Appl. No.: 18/264,297

(22) PCT Filed: Jan. 28, 2022

(86) PCT No.: PCT/EP2022/052129
§ 371 (c)(1),
(2) Date: Aug. 4, 2023

(87) PCT Pub. No.: WO2022/171463
PCT Pub. Date: Aug. 18, 2022

(65) Prior Publication Data
US 2024/0117825 A1    Apr. 11, 2024

(30) Foreign Application Priority Data
Feb. 9, 2021 (DE) .................... 10 2021 201 221.3

(51) Int. Cl.
*F15B 15/20* (2006.01)
*F16F 9/32* (2006.01)
*F16F 9/516* (2006.01)

(52) U.S. Cl.
CPC .......... *F15B 15/204* (2013.01); *F16F 9/3228* (2013.01); *F16F 9/516* (2013.01)

(58) Field of Classification Search
CPC ......... F15B 15/204; F16F 9/19; F16F 9/3214; F16F 9/3228; F16F 9/34; F16F 9/3405; F16F 9/342; F16F 9/516
See application file for complete search history.

(56) References Cited

U.S. PATENT DOCUMENTS

| 5,104,098 A | 4/1992 | Kaneko |
| 5,409,088 A * | 4/1995 | Sonsterod ............. F16F 9/3214 188/282.3 |

(Continued)

FOREIGN PATENT DOCUMENTS

| DE | 4227554 B4 | 4/2004 |
| DE | 202009004751 U1 | 9/2010 |

(Continued)

*Primary Examiner* — Kenneth Bomberg
*Assistant Examiner* — Matthew Wiblin
(74) *Attorney, Agent, or Firm* — McGlew and Tuttle, P.C.

(57) ABSTRACT

An assembly for a fluid-filled piston-cylinder unit comprises a main body having an assembly longitudinal axis (24), a valve unit integrated in the main body and having an overflow channel, which valve unit seals the overflow channel when the assembly is moved along the assembly longitudinal axis in a first direction and releases the overflow channel, in dependence on the fluid pressure, when the assembly is moved along the assembly longitudinal axis in a second direction. Furthermore, the assembly comprises an outer seal element that is arranged on the main body so as to be moved along the assembly longitudinal axis, for abutting in a sealing manner against an inner surface of the housing, and at least one undercut element formed on the main body for engaging in an interlocking manner behind a mating element of the piston-cylinder unit.

20 Claims, 20 Drawing Sheets

(56) References Cited

U.S. PATENT DOCUMENTS

| | | | |
|---|---|---|---|
| 5,839,719 A | 11/1998 | Hosan et al. | |
| 6,179,099 B1 | 1/2001 | Koch et al. | |
| 2011/0214953 A1* | 9/2011 | Maeda | F16F 9/19 188/266 |
| 2012/0037469 A1 | 2/2012 | Juan | |
| 2017/0211653 A1 | 7/2017 | Zuo et al. | |

FOREIGN PATENT DOCUMENTS

| | | |
|---|---|---|
| DE | 102016223486 A1 | 7/2017 |
| DE | 102018131457 A1 | 6/2020 |
| EP | 0906523 B1 | 12/1999 |
| EP | 2366916 A1 | 9/2011 |
| EP | 3358213 A1 | 8/2018 |

* cited by examiner

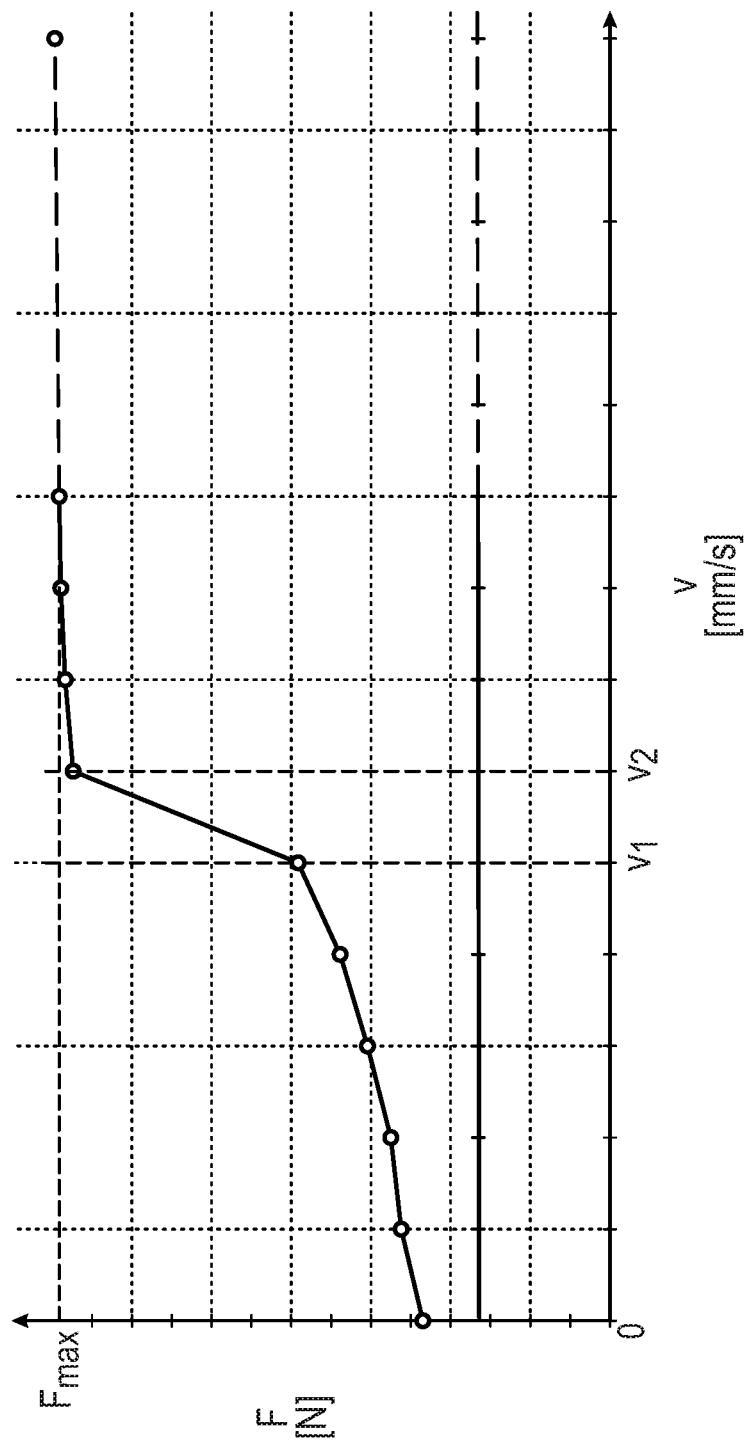

ASSEMBLY FOR A FLUID-FILLED PISTON-CYLINDER UNIT AND FLUID-FILLED PISTON-CYLINDER UNIT HAVING AN ASSEMBLY OF THIS TYPE

This application claims the priority of German patent application, serial no. DE 10 2021 201 221.3, filed Feb. 9, 2021, the content of which is incorporated herein by reference as if fully set forth herein.

FIELD OF THE INVENTION

The invention relates to an assembly for a fluid-filled piston-cylinder unit and to a fluid-filled piston-cylinder unit having an assembly of this type.

BACKGROUND OF THE INVENTION

DE 10 2016 223 486 A1 discloses a fluid-filled piston-cylinder unit having an overpressure function. A piston of the piston-cylinder unit has a piston valve which releases a first fluid channel in dependence on a fluid pressure.

SUMMARY OF THE INVENTION

It is an object of the invention to improve, in particular simplify, the manufacture, in particular the assembly, of a fluid-filled piston-cylinder unit.

The object is achieved by an assembly for a fluid-filled piston-cylinder unit, the assembly comprising a main body having an assembly longitudinal axis, a valve unit integrated in the main body, said valve unit having an overflow channel, sealing the overflow channel when the assembly is moved along the assembly longitudinal axis in a first direction, and releasing the overflow channel, in dependence on the fluid pressure, when the assembly is moved along the assembly longitudinal axis in a second direction, an outer seal element that is arranged on the main body so as to be moved along the assembly longitudinal axis, for abutting in a sealing manner against an inner surface of the housing, and at least one undercut element formed on the main body for engaging in an interlocking manner behind a mating element of the piston-cylinder unit.

The object is further achieved by a fluid-filled piston-cylinder unit with a cylindrical housing having a housing longitudinal axis and an interior space, a piston rod which is guided out of the housing in a sealed manner and can be moved along the housing longitudinal axis, a piston which is fastened to the piston rod and which divides the interior space into a first partial interior space and a second partial interior space, wherein the partial interior spaces can be connected to one another fluidically via the overflow channel, and an assembly according to the invention, wherein the assembly is held in a form-fit manner on the piston rod along the housing longitudinal axis.

The essence of the invention is that an assembly which has an integrated valve unit can be mounted in an uncomplicated and fail-safe manner on a mating element of a piston-cylinder unit. The assembly is held in an interlocking manner on the mating element along a housing longitudinal axis of a housing of the piston-cylinder unit. In particular, the mating element is firmly connected to a piston rod of the piston-cylinder unit. A displacement of the piston rod therefore directly causes a displacement of the mating element and of the assembly attached thereto. The mating element can be designed as a separate component with respect to the piston rod and be attached to the piston rod. However, it is also conceivable that the mating element is formed in one piece on the piston rod, in particular moulded onto the piston rod.

For simplified mounting of the assembly, the latter has at least one undercut element which is formed on a main body. In particular, the undercut element is formed in one piece on the main body. The undercut element serves to engage behind the mating element of the piston-cylinder unit in an interlocking manner. The mating element is held axially on the piston-cylinder unit, in particular on the piston rod. By means of the undercut element, a reliable axially secure fastening of the assembly to the piston rod of the piston-cylinder unit is ensured. The assembly is axially fixed to the piston rod along the assembly longitudinal axis.

The assembly according to the invention can be mounted in an effortless and uncomplicated manner. The manufacturing and/or mounting effort is low. Existing piston-cylinder units can be easily retrofitted and thus have increased functionality. Existing piston-cylinder units can be upgraded easily and retroactively. The expenses for this are low.

The assembly constitutes an auxiliary module for the piston-cylinder unit. Surprisingly, it has been found that a piston-cylinder unit known per se without a valve function can be functionally upgraded in an effortless and uncomplicated manner by means of the assembly according to the invention. The piston-cylinder unit designed with the assembly has the valve function of the assembly.

The housing of the piston-cylinder unit is filled with a fluid, in particular a gas and/or a liquid, in particular a hydraulic oil.

The assembly has a main body having an assembly longitudinal axis, in which main body the valve unit is integrated. The main body is configured in particular in the form of a sleeve. The valve unit has an overflow channel which is in particular configured to be integrated in the main body, in particular in the form of an opening in the main body extending essentially along the assembly longitudinal axis. When the assembly is moved in a first direction along the assembly longitudinal axis, the overflow channel is sealed by the valve unit. When the assembly is moved in a second direction, which is opposite to the first direction, the overflow channel is released by the valve unit in dependence on the fluid pressure. The assembly has an outer seal element which is arranged on the main body such that it can be moved along the assembly longitudinal axis and which serves to abut in a sealing manner against an inner surface of the piston-cylinder unit, in particular against an inner surface the housing thereof.

In particular, the assembly allows the overflow channel to be released also depending on the speed when the assembly is moved in the first direction. In particular, the overflow channel can remain released if the assembly is moved in the first direction at a speed that is lower than a first limit speed. In particular, the first limit speed can be set variably. When the first limit speed is reached or exceeded, the overflow channel is sealed.

It is advantageous if the valve unit can be brought into an overload position to allow fluid flow through the overflow channel, in particular manually.

In order to improve the fastening of the assembly to the mating element, it is advantageous if the at least one undercut element has a contour which extends in the circumferential direction about the assembly longitudinal axis along an opening angle which is at least 30°. The opening angle is in particular at least 45°, in particular at least 60°, in particular at least 90°, in particular at least 135°, in particular at least 1800 and in particular at least 270°. The at least one undercut element can also have a contour which extends along the entire circumference, i.e. over 360°. In this case, the contour of the mating element is fully encompassed by the at least one undercut element.

A plurality of undercut elements, arranged in particular distributed in the circumferential direction around the assembly longitudinal axis, ensure a secure connection between the assembly and the piston rod. In particular, the undercut elements are arranged to be distributed in the circumferential direction around the assembly longitudinal axis, in particular in an evenly spaced manner. In particular, the assembly has at least two, in particular at least three, in particular at least four, in particular at least six, in particular at least eight, in particular at least 12, in particular at least 16, and in particular at least 50 undercut elements. The undercut elements are arranged in particular along a circular line in a plane perpendicular to the longitudinal axis.

Eight undercut elements have proven to be particularly advantageous. This simplifies the manufacture of the assembly and in particular of the main body. In particular, the main body can be produced from a plastic material in an injection moulding process without effort. In particular, the demoulding of the main body from an injection moulding tool is possible without a slider.

Alternatively, it is possible to configure the main body with exactly one undercut element which extends in the circumferential direction around the assembly longitudinal axis, in particular along an opening angle of at least 270°, in particular at least 300°, in particular at least 330° and in particular along the full circumference, i.e. over 360°.

A valve unit having a valve element which is movable along the assembly longitudinal axis and abuts in a sealing manner against a valve seat in order to seal the overflow channel ensures reliable sealing of the overflow channel in dependence on the displacement direction of the assembly.

A valve element being pressed against the valve seat by means of a spring element enables a compact design and a fail-safe embodiment of the sealing function. The valve element is pressed against the valve seat by means of a spring element. The valve seat is in particular arranged on and/or in the main body. The valve seat is in particular configured to be integrated on and/or in the main body. The valve seat is in particular formed as an inner surface of the main body. The spring element is designed in particular as a mechanical spring element, in particular in the form of a helical compression spring. The direction of action of the spring force that can be exerted by the spring element corresponds in particular to the second direction. The spring force with which the valve element is pressed against the valve seat is determined by the selection of the spring element, in particular the helical compression spring. The selection of the spring element thus determines the fluid pressure that releases the overflow channel when the assembly is moved in the second direction.

A two-part design of the main body, wherein the main body is configured in two parts with a main body front part and a main body rear part which can be connected thereto, in particular detachably, in particular so as to be screwable, simplifies the pre-mounting of the assembly itself. In particular, the integration of the valve unit into the main body is thereby simplified.

Alternatively, the main body can also be made in one piece. This simplifies the manufacture of the main body itself. The main body has a robust design.

The one-part or two-part design of the main body is possible irrespective of whether the piston-cylinder unit enables fluid damping in the direction of insertion or in the direction of extraction.

An arrangement of the at least one undercut element on the end face of the main body, in particular on the main body front part, simplifies the mounting of the assembly on the piston rod. The at least one undercut element is arranged on the end face of the main body and in particular on the end face of a front part of the main body, which in particular faces the piston rod and the piston.

An embodiment of the at least one undercut element as a snap-on hook which is designed to snap axially onto the mating element, wherein in particular the snap-on hook has a press-on bevel, enables a particularly uncomplicated installation. By means of the snap-on hook, an axial snapping of the assembly onto the mating element of the piston-cylinder unit is possible.

An embodiment of the snap-on hook with a press-on bevel makes axial snapping on easier. By means of the press-on bevel, the snap-on hook is pressed radially outwards in relation to the assembly longitudinal axis. Since the snap-on hook is designed to be elastic, it can snap radially inwards again after it has been pressed over the press-on bevel and engage behind the mating element in an interlocking manner. The elasticity of the snap-on hook is based in particular on a material elasticity and/or a structural elasticity. The material elasticity is defined by the material from which the snap-on hook is formed. The material used for the assembly and in particular for the snap-on hook is in particular a plastic material which has a reduced friction coefficient, wherein the friction coefficient of the plastic material with steel is in particular less than 0.5, in particular at most 0.3, in particular at most 0.15, in particular at most 0.05. The plastic material used is in particular polyoxymethylene (POM), polyetheretherketone (PEEK) and/or polyamide (PA).

The structural elasticity results from the reduced radial thickness of the snap-on hook and the resulting reduced section modulus against bending.

Alternatively, the at least one undercut element defines a slot into which the mating element of the piston-cylinder unit can be inserted in the radial direction with respect to the assembly longitudinal axis. The undercut element extends in the circumferential direction of the assembly longitudinal axis along a circumferential angle which is in particular at least 30°, in particular at least 45°, in particular at least 90°, in particular at least 120°, in particular at least 135° and in particular 180°. The undercut element is configured in a plane perpendicular to the assembly longitudinal axis, in particular to be U-shaped. The undercut element is configured to be rigid.

A design of the valve unit with an overload position prevents undesired blocking of the assembly and in particular enables a blocking position to be overcome manually, in particular by manual overpressing, i.e. by external application of force in the first direction. In particular, this makes it possible to advantageously couple, for example, a lid, in particular a trunk lid of a motor vehicle, on which a piston-cylinder unit, in particular a gas spring, configured with the assembly, and a drive, in particular an electric drive, for the opening and closing movement are provided. In the event of a failure of the drive, a displacement of the assembly along the first direction at an increased speed, which is in particular greater than the first limit speed, leads to a sealing of the overflow channel and thus to a blockage of the fluid flow. The displacement movement, i.e. the closing movement of the trunk lid, is slowed down and in particular stopped. To prevent the trunk lid from blocking in this open state, the overload position is used to displace the valve unit, in particular manually. The trunk lid can be closed manually.

In particular, this overload position is created due to the fact that the valve unit can be moved into a position in which an enlarged flow cross-section exists.

An embodiment of the overflow channel, in which the overflow channel has at least one transverse channel which extends at least in sections transversely and in particular perpendicularly to the assembly longitudinal axis on an end face of the main body that faces the at least one undercut element, ensures fluid flow through the assembly when it is mounted, in particular, on the end face of the mating element of the piston-cylinder unit.

An embodiment of the overflow channel, in which the overflow channel has at least one axial recess extending along the assembly longitudinal axis on an end face of the main body that faces the at least one undercut element, improves the fluid flow through the overflow channel. For this purpose, an axial recess is arranged on an end face of the main body facing the at least one undercut element, which recess can in particular be configured to be cylindrical, concave and/or spherical dome-shaped.

An integrated passage opening of the overflow channel, in which the passage opening is integrated in the main body, which passage opening extends in particular up to an end face of the main body that faces the at least one undercut element, simplifies the function of the overflow channel.

A fluid-filled piston-cylinder unit with a cylindrical housing having a housing longitudinal axis and an interior space, a piston rod which is guided out of the housing in a sealed manner and can be moved along the housing longitudinal axis, a piston which is fastened to the piston rod and which divides the interior space into a first partial interior space and a second partial interior space, wherein the partial interior spaces can be connected to one another fluidically via the overflow channel, and an assembly according to the invention, wherein the assembly is held in a form-fit manner on the piston rod along the housing longitudinal axis, has essentially the advantages of the assembly, to which reference is hereby made. The overflow function of the piston-cylinder unit is ensured due to the fact that the assembly is held in a form-fit manner on the piston rod, in particular on a mating element that is axially fastened to the piston rod. Due to the fact that the assembly can be mounted directly and in an uncomplicated manner on the mating element reduces the manufacturing, in particular the mounting effort. In particular, the assembly is arranged in the housing of the piston-cylinder unit. In particular, the assembly longitudinal axis is oriented concentrically relative to the housing longitudinal axis.

A piston-cylinder unit, in which the assembly can be mounted on the mat-ing element by sliding it on, either along the housing longitudinal axis or transversely, in particular perpendicularly, to the housing longitudinal axis, ensures an uncomplicated installation. The installation is incomplex and can be carried out in particular automatically.

The connection of the assembly to the piston rod, in which the assembly is detachably or non-detachably connected to the piston rod, allows various options. When the assembly has been slid on in a direction transverse to the housing longitudinal axis, it is possible to detach the assembly from the piston rod, in particular from the mating element, by pulling the assembly off the piston rod in a radial direction. This makes it possible to replace a defective assembly, for example. The repair and/or maintenance effort is simplified. In particular, repair costs are reduced, since not the entire piston-cylinder unit, but only the assembly and/or the piston rod must be replaced. Resources are conserved. The detachable connection of the assembly to the piston rod is economically advantageous. In particular, it is conceivable to replace a first assembly with a second assembly, for example to change the predetermined fluid pressure at which the valve unit releases the overflow channel.

In the event of a non-detachable connection of the assembly to the piston rod, for example, a replacement of the housing at the piston-cylinder unit is simplified. When the piston rod with the assembly is removed from the housing, the assembly is reliably held to the piston rod. Non-detachable in the sense of the invention means that the assembly cannot be detached from the piston rod without mechanically destroying the mating element and/or the at least one undercut element.

Both the features indicated according to the invention and the features indicated in the embodiment examples of an assembly according to the invention are each suitable, alone or in combination with each other, for further embodying the subject-matter according to the invention. The respective combinations of features do not represent any restriction with regard to the further embodiments of the subject-matter of the invention, but are essentially merely exemplary in character.

Further features, advantages and details of the invention will be apparent from the following description of five embodiment examples with reference to the drawing

BRIEF DESCRIPTION OF THE DRAWING

FIG. 23 shows a force-speed diagram for the piston-cylinder unit according to FIG. 17.

DESCRIPTION OF THE PREFERRED EMBODIMENTS

Figure 1:
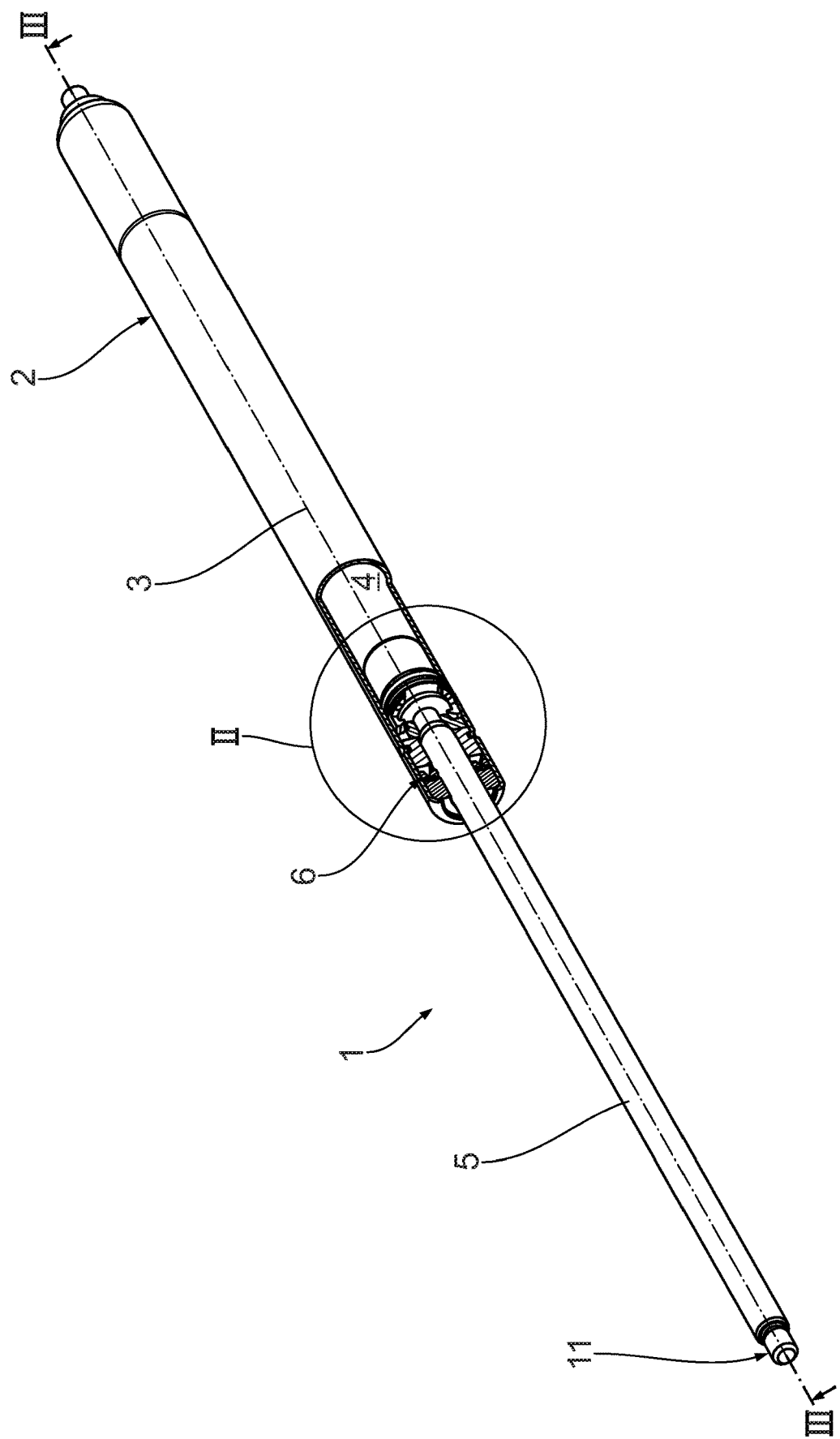
FIG. 1 shows a perspective, partially sectioned illustration of a piston-cylinder unit according to a first embodiment example.
Figure 2:
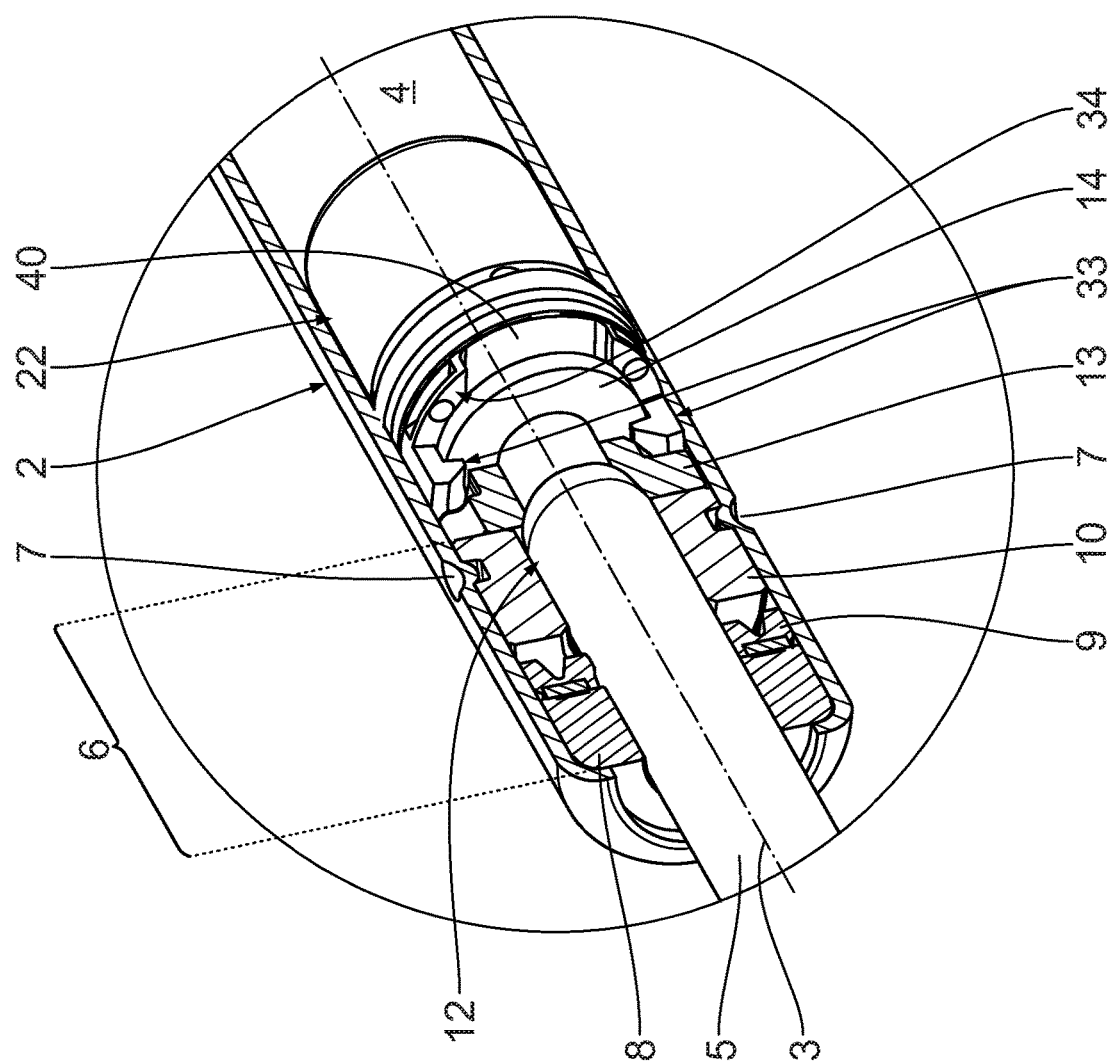
FIG. 2 shows an enlarged detailed illustration according to detail II in FIG. 1.
Figure 3:
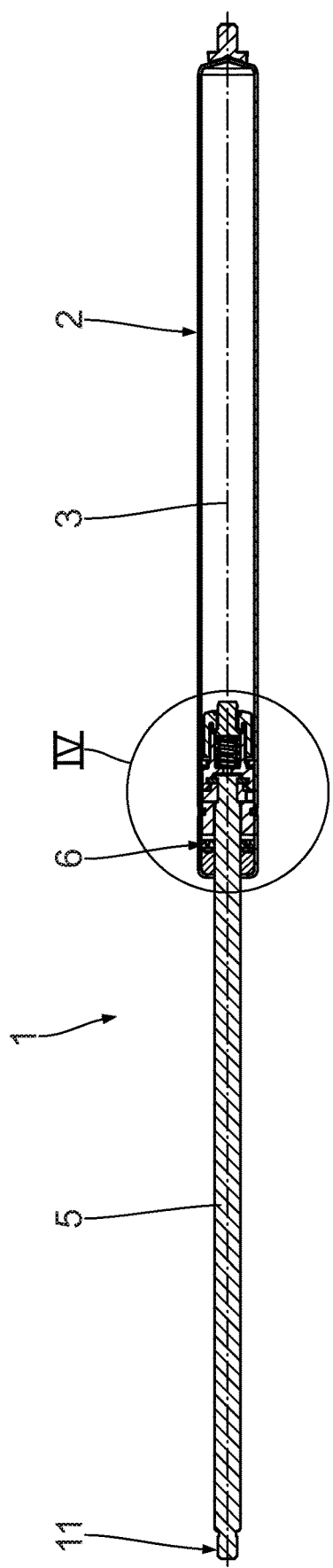
FIG. 3 shows a sectional representation according to section line III-III in FIG. 1.

A piston-cylinder unit marked as a whole with 1 in FIGS. 1 to 6 has a cylindrical housing 2 with a housing longitudinal axis 3, wherein the housing 2 encloses an interior space 4. A fluid is arranged in the interior space 4 of the housing 2. The piston-cylinder unit 1 is filled with fluid. The fluid can be a liquid, in particular a hydraulic liquid, in particular a hydraulic oil, or a gas. A piston rod 5 is led out of the housing 2 in a sealed manner. A guide/seal unit 6 that is arranged at the piston rod end of the housing 2 is used for this purpose. In addition to sealing the piston rod 5, the guide/seal unit 6 also ensures the guided displacement of the piston rod 5 along the housing longitudinal axis 3.

The guide/seal unit 6 is fixed in the housing 2 by means of indentations 7 axially with respect to the housing longitudinal axis 3.

The guide/seal unit 6 comprises a supporting disc 8 at the piston rod end of the housing 2, which ensures radial support of the piston rod 5. Along the housing longitudinal axis 3, a piston rod seal element 9 adjoins the supporting disc 8 and abuts in a sealing manner against the outside of the piston rod 5. In particular, this prevents impurities from entering the housing 2, in particular the interior space 4, and/or fluid from escaping from the housing 2. A limiting element 10 adjoins the piston rod seal element 9 along the housing longitudinal axis 3, which limiting element 10 faces the interior space 4 and limits the latter axially. The limiting element 10 serves in particular as an axial stop element for a piston 13 that is attached to the piston rod 5.

The piston rod 5 is arranged with a first, outer end 11 outside the housing 2. According to the embodiment example shown, the first end 11 is in the form of a threaded pin to which a fastening element not shown can be attached, in particular screwed on. Such a fastening element serves to fasten the piston-cylinder unit 1 to an object. The fastening element can also be firmly, in particular non-detachably, attached to the first end 11 of the piston rod 5.

At a second end 12 that is opposite the first end 11, the piston 13 and a mating element 14 are attached to the piston rod 5. The piston 13 and the mating element 14 are held axially on the piston rod 5 along the housing longitudinal axis 3 between an abutment shoulder 15 of the piston rod 5 and an end face collar 16 of the piston rod 5. The end face collar 16 of the piston rod 5 is produced in particular by forming and projects in the radial direction with respect to the housing longitudinal axis 3 with respect to the outer diameter of a region of the piston rod 5 in which the piston 13 and the mating element 14 are arranged. The piston 13 and the mating element 14 are held in an interlocking manner on the piston rod 5.

The piston 13 divides the interior space 4 into a first partial interior space 17 and a second partial interior space 18. The first partial interior space 17 faces the piston rod end of the housing 2. The first partial interior space 17 is formed between the piston 13 and the first limiting element 10. According to the illustrations in FIGS. 2 and 4, the piston rod 5 with the piston 13 is in a maximum extraction position. This means that the piston 13 is in contact with the limiting element 10. The first partial interior space 17 is not present in this arrangement.

The second partial interior space 18 is formed between the piston 13 and the end of the housing 2 on the housing side in the axial direction with respect to the housing longitudinal axis 3. In the arrangement of the piston rod 5 with the piston 13 according to FIGS. 2 and 4, the second partial interior space 18 corresponds to the interior space 4.

The piston 13 is designed in the shape of a disc. The piston 13 has at least one, and in particular multiple, through-flow openings 19 through which the fluid can flow from the first partial interior space 17 into the second partial interior space 18 and vice versa.

The through-flow openings 19 are arranged in a disc section 20 of the piston 13. The disc section 20 is characterized by the fact that its outer diameter $d_A$ essentially corresponds to the inner diameter $d_I$ of the housing 2. In particular, the following applies: $d_A < d_I$, in particular $d_A \geq 0.9 \cdot d_I$, in particular $d_A \geq 0.95 \cdot d_I$ and in particular $d_A \geq 0.98 \cdot d_I$.

A spacer section 21 is integrally in one piece with the disc section 20 on the piston 13. The spacer section 21 has a reduced outer diameter $d_{A,red}$ compared to the disc section 20, which is at most 80%, in particular at most 70% and in particular at most 60% of the outer diameter $d_A$ of the disc section 20.

The piston 13 is configured in a stepped manner due to the design with disc section 20 and spacer section 21. The mating element 14 abuts against the distance section 21. The mating element 14 is designed as an annular disc with a disc diameter $d_S$. The following applies: $d_{A,red} < d_S < d_A$.

According to the embodiment example shown, the piston 13 and the mating element 14 are manufactured as two separate components. However, it is also conceivable that the disc-shaped mating element 14 is formed in one piece with the piston 13. In particular, it is conceivable that the piston 13 and/or the mating element 14 are configured in one piece with the piston rod 5.

An assembly designated as a whole with 22 is held in an interlocking manner on the mating element 14.

The assembly 22 has a main body 23 which has an assembly longitudinal axis 24. The assembly 22 is arranged in the housing 2 of the piston-cylinder unit 1 such that the assembly longitudinal axis 24 is oriented concentrically to the housing longitudinal axis 3. The main body 23 has a main body outer diameter $d_G$ which is substantially constant along the assembly longitudinal axis 24. The main body 23 is essentially configured to be sleeve-like. A maximum main body outer diameter $d_G$ is smaller than the inner diameter $d_I$ of the housing 2.

The main body 23 has an outer groove 25 in which an outer seal element 26 is arranged. The outer seal element 26 serves to abut in a sealing manner against the inner surface 27 of the housing 2 of the piston-cylinder unit 1. The outer groove 25 has a groove width $b_N$ oriented along the assembly longitudinal axis 24, which groove width $b_N$ is greater than the thickness $d_D$ of the outer seal element 26 oriented along the assembly longitudinal axis 24. The outer groove 25 is bounded by a first groove flank 28 which, according to the embodiment example shown, is oriented towards the piston rod 5. Due to the outer seal element 26 abutting against the first groove flank 28, a fluid flow on an outer side of the main body 23 is sealed by the outer seal element 26.

The outer groove 25 has a second groove flank 29, on whose end face facing the outer groove 25 at least one and in particular multiple, in particular four, groove transverse openings 30 are arranged along the outer circumference. This ensures a fluid flow through the at least one groove transverse opening 30 when the outer seal element 26 abuts against the second groove flank 29.

According to the embodiment example shown, the main body 23 is configured in two parts with a main body front part 31 and a main body rear part 32 detachably connected, in particular screwed, thereto. For this purpose, the main body front part 31 has an external thread onto which the main body rear part 32 is screwed with a corresponding internal thread. Due to the fact that the main body 23 is made in two parts, the design of the external groove 25 is simplified. In particular, the outer groove 25 is formed between the main body front part 31 and the main body rear part 32. In particular, the first groove flank 28 is formed on the main body front part 31. In particular, the second groove flank 29 is formed on the main body rear part 32.

The main body 23 has an undercut element 33 with which the assembly 22 is held on the mating element 14 and thus on the piston rod 5 in an axially interlocking manner. The undercut element 33 engages behind the mating element 14 in a direction along the assembly longitudinal axis 24. The undercut element 33 is arranged in one piece on the main body front part 31 and in particular on an end face 34 of the main body 23 facing the piston rod 5. In particular, the undercut element 33 is formed in one piece on the main body 23.

The undercut element 33 is designed as an axial web which extends along the assembly longitudinal axis 24 in the axial direction. The axial web is arranged in the region of the outer circumference of the main body 23, in particular of the main body front part 31. The axial web is essentially rigid. The axial web has a substantially hook-shaped contour. The axial web of the undercut element 33 has a hook projection 35 projecting radially inwards with respect to the assembly longitudinal axis 24. A slot 36 is defined in the axial direction by the hook projection 35 and the end face 34. The slot 36 has a slot width $b_{Sch}$ which essentially corresponds to the disc thickness of the mating element 14. In particular, the slot 36 has a slot inner diameter $d_{IS}$ which substantially corresponds to the disc diameter $d_S$. The mating element 14 is arranged reliably and in an interlocking manner in the slot 36.

The undercut element 33, in particular the hook-shaped axial web, extends in the circumferential direction around the assembly longitudinal axis 24 with an opening angle of 180°. According to the embodiment example shown, the undercut element 33 extends along half the circumference of the main body 23. It is also conceivable that the opening angle is smaller than 180°.

Figure 6:
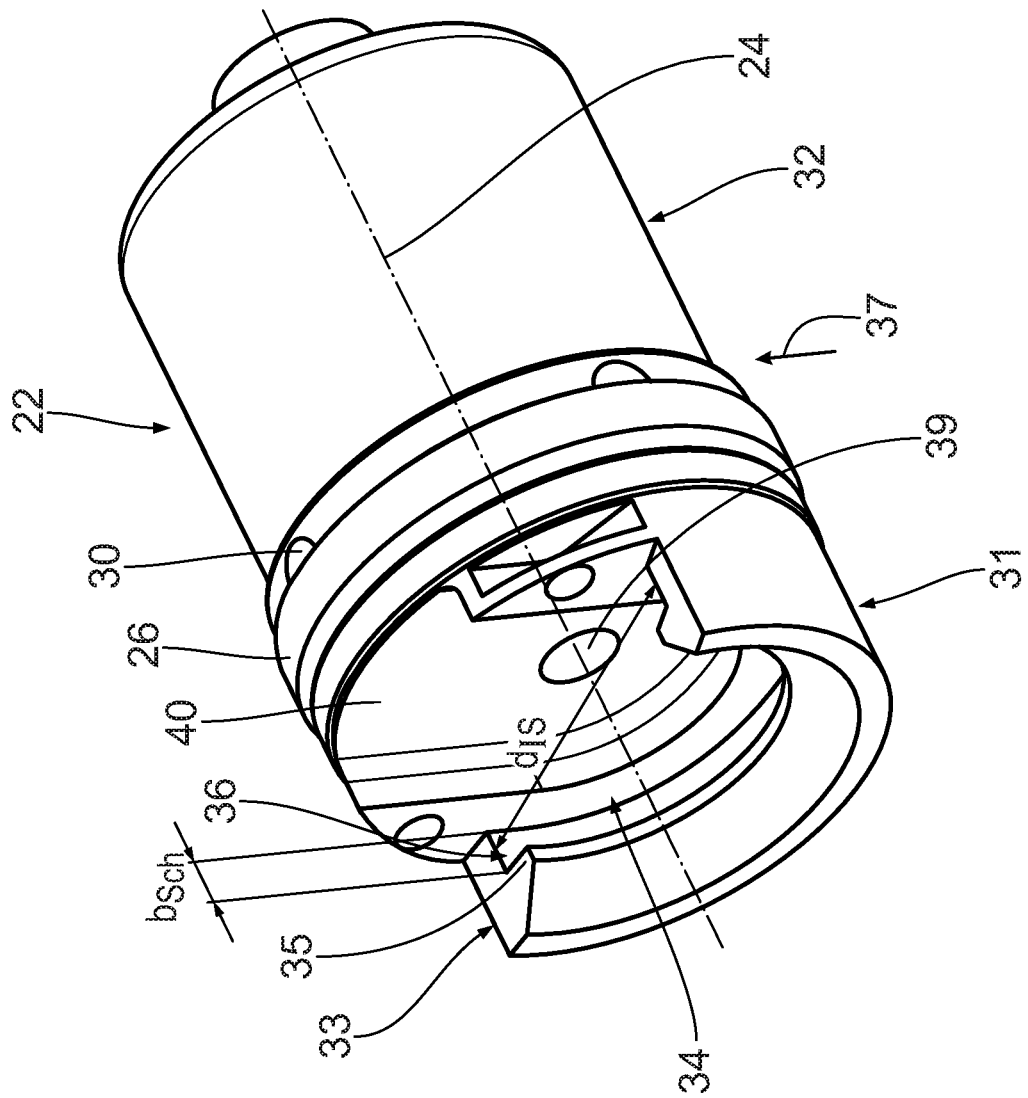
FIG. 6 shows an enlarged perspective illustration of an assembly of the piston-cylinder unit according to FIG. 1.
Figure 7:
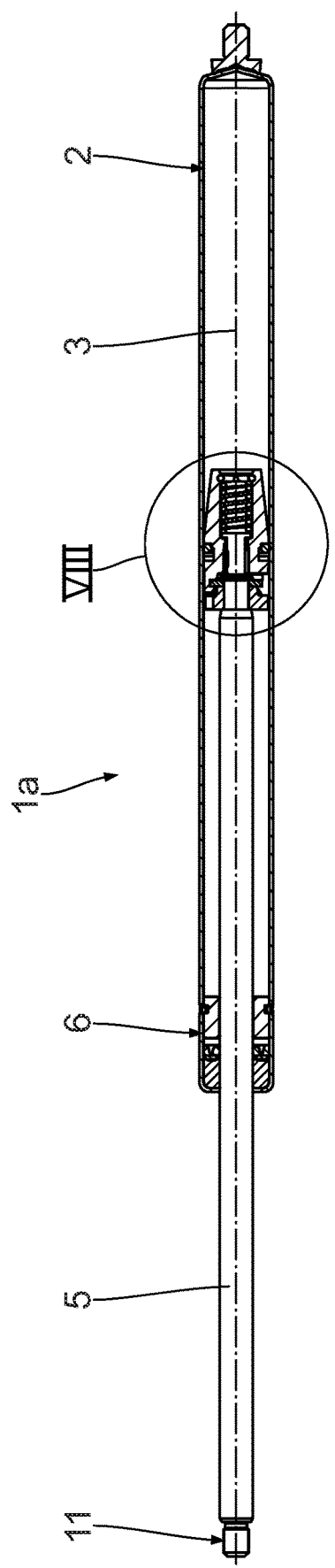
FIG. 7 shows a sectional representation corresponding to FIG. 3 of a piston-cylinder unit according to a second embodiment example.
Figure 8:
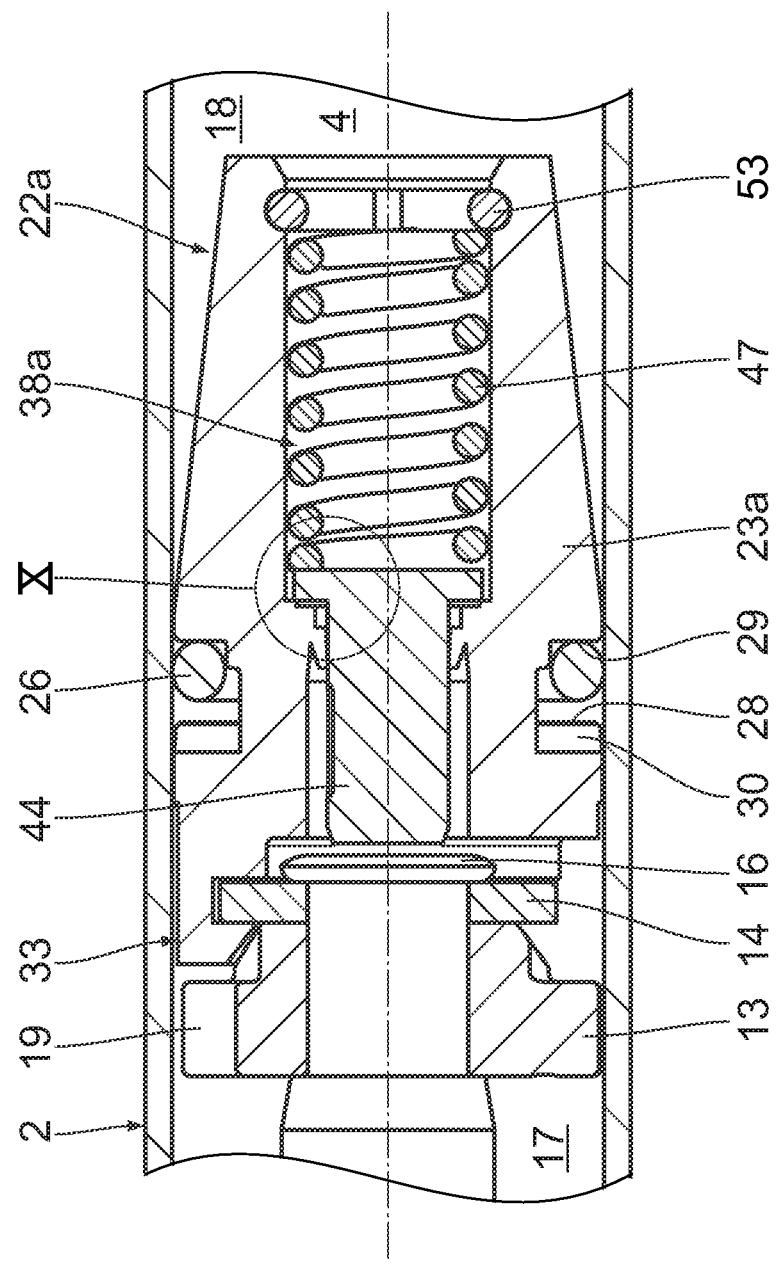
FIG. 8 shows an enlarged detailed illustration of detail VIII in FIG. 7.
Figure 9:
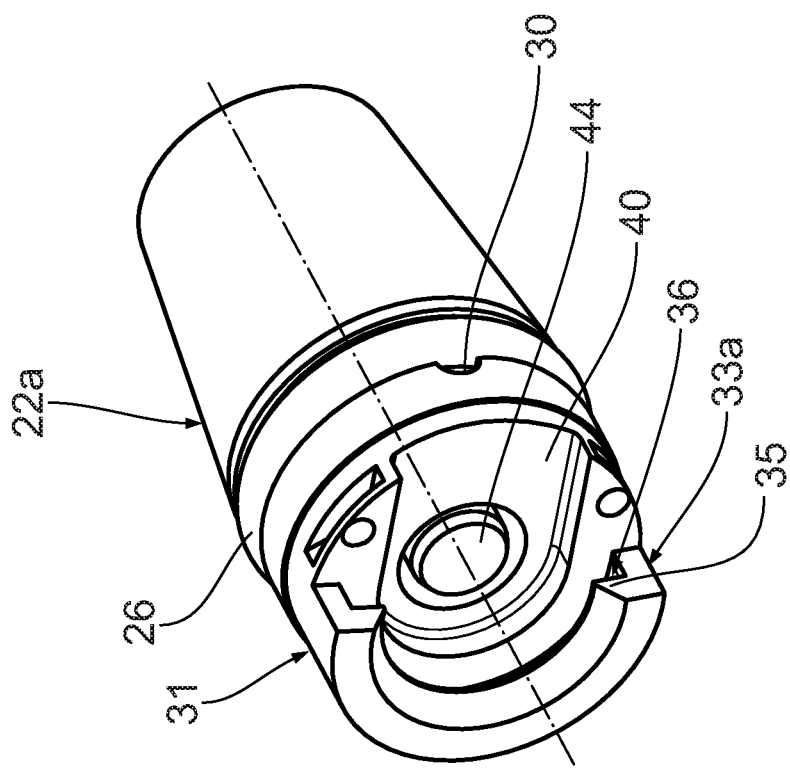
FIG. 9 shows a perspective illustration of the assembly according to the second embodiment example corresponding to FIG. 6.

The installation of the main body 23 on the piston rod 5, in particular on the mating element 14, is possible in a particularly uncomplicated manner by sliding the main body 23, as shown in FIG. 6, along a slide-on direction 37, which is oriented transversely and in particular perpendicularly to the assembly longitudinal axis 24, i.e. to the main body longitudinal axis 3. The slot 36 serves to receive the mating element 14. By sliding the assembly 22 onto the mating element 14, the assembly 22 is detachably connected to the piston rod 5. To release the connection, the assembly 22 can be pulled off the piston rod 5 or the mating element 14 in the opposite direction to the slide-on direction 37.

The main body 23 has a valve unit with an integrated overflow channel. The overflow channel has a first integrated passage opening 39, which is arranged on the end face of the main body 23 and faces the piston rod 5. In particular, the first passage opening 39 is arranged facing the undercut element 33 and the end face 34. The first passage opening 39 opens into a substantially U-shaped axial recess 40, which is arranged on the end face 34 of the main body 23. The axial recess 40 has a fluid connection with the first passage opening 39. As shown in FIG. 6, the axial recess 40 may extend in a radial direction with respect to the assembly longitudinal axis 24, to the outer contour of the main body 23. Alternatively, it is possible for the axial recess 40 to be configured cylindrically, for example, wherein a transverse channel ensures a fluid connection at the end face 34 of the main body 23 to the outer contour of the main body 23. Such a transverse channel is integrally formed by the axial recess 40 in the embodiment example shown.

The overflow opening has a spring receiving chamber 41 which has a fluid connection with the first passage opening 39. The spring receiving chamber 41 is essentially configured to be hollow-cylindrical and has a second passage opening 42 on an end side which is arranged opposite the first passage opening 39. The second passage opening 42 opens into the second partial interior space 18.

According to the embodiment example shown, the overflow channel is formed by the axial recess 40, the first passage opening 39, the spring receiving chamber 41 and the second passage opening 42, which are arranged one behind the other along the assembly longitudinal axis 24 in the order mentioned and each have a fluid connection with each other in pairs.

At the transition of the spring receiving chamber 41 into the second passage opening 42, an integral abutment shoulder is configured on the main body rear part. The integral abutment shoulder has a sealing surface which forms a valve seat 43 of the valve unit 38. The valve unit 38 further comprises a bolt-shaped valve element 44, which is arranged with a cylinder section 45 substantially within the second passage opening 42. A radial collar 46 that projects in a radial direction with respect to the assembly longitudinal axis 24 relative to the cylinder section 45 is arranged within the spring receiving chamber 41. On an underside of the radial collar 46, the valve element 44 has a sealing surface with which the valve element 44 can abut in a sealing manner against the valve seat 43. In this case, the overflow channel, in particular the second passage opening 42, is sealed. A fluid flow through the overflow channel is then prevented.

Figure 4:
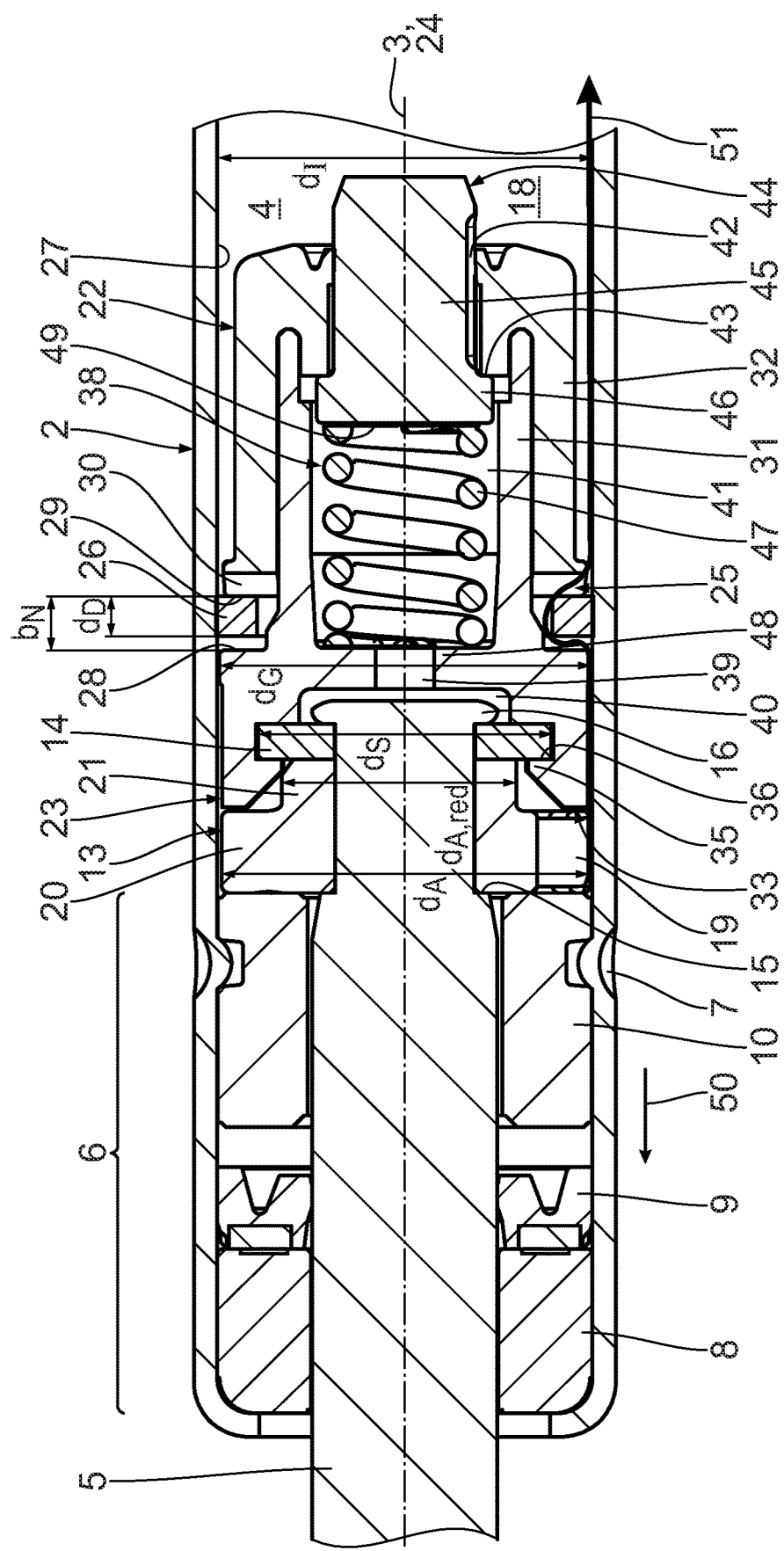
FIG. 4 shows an enlarged detailed illustration of detail IV in FIG. 3 indicating a fluid flow when the piston-cylinder unit is actuated in a direction of extraction.

The valve unit 38 further comprises a spring element 47 in the form of a mechanical helical compression spring, which is supported in the axial direction on a transverse wall 48 surrounding the first passage opening 39 and on an end face 49 of the valve element 44. The spring element 47 is dimensioned such that it exerts a spring force on the valve element 44 in such a manner that the valve element 44 is pressed against the valve seat 43. According to the embodiment example shown, the effective direction of the spring force is oriented from left to right as shown in FIG. 4, i.e. in a direction along the assembly longitudinal axis 24 oriented from the first passage opening 39 towards the second passage opening 42.

Figure 5:
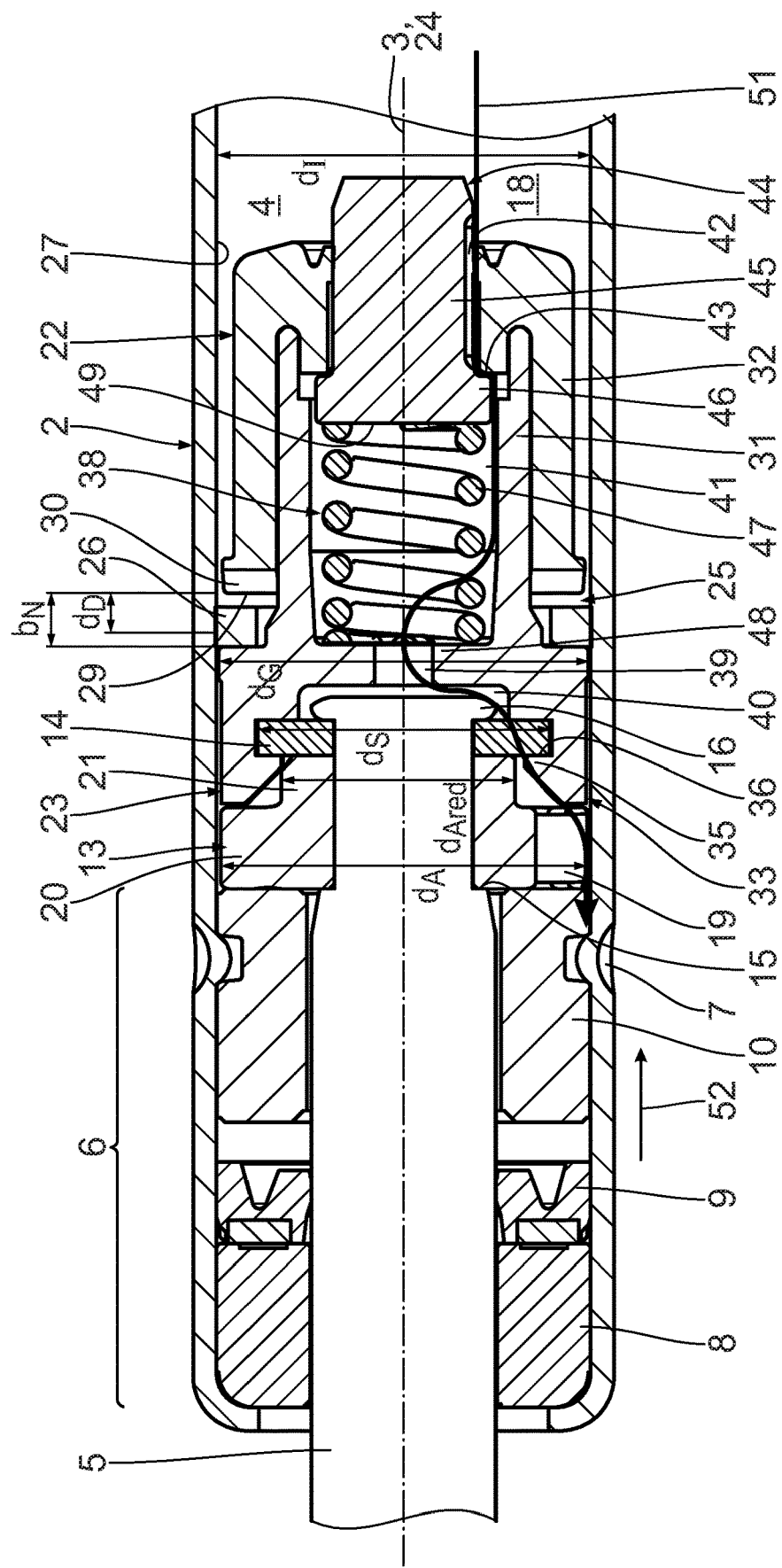
FIG. 5 shows an illustration corresponding to FIG. 4 indicating the fluid flow when the piston-cylinder unit is actuated in the direction of insertion.

In the following, the function of the piston-cylinder unit, in particular the valve unit 38 of the retrofittable assembly 22 is explained in more detail with reference to FIGS. 4 and 5. When the piston rod 5 is actuated along a direction of extraction 50, the fluid is displaced from the first partial interior space 17 into the second partial interior space 18. In the process, the fluid pressure acts on the valve element 44 on the one hand along the overflow channel, i.e. via the axial recess 40, the first passage opening 39 and the spring receiving chamber 41. The fluid pressure acting in this way acts in the same direction as the spring element 47. The valve element 44 abuts in a sealing manner against the valve seat 43. The overflow channel is sealed. According to this embodiment example, the direction of extraction 50 corresponds to a first direction.

However, the fluid pressure also acts on the outer seal element 26, which is moved away from the first groove flank 28 along the assembly longitudinal axis 24—and towards the second groove flank 29. As a result of the transverse opening 33, the outer seal element 26 is arranged spaced apart from the second groove flank 29. Fluid can flow around the outer seal element 26 in the region of the outer groove 25 and thus pass from the first partial interior space 17 into the second partial interior space 18. The fluid flow is symbolized in FIG. 4 by means of the flow part 51.

When the piston-cylinder unit 1 is actuated in a second direction, i.e. along a direction of insertion 52, the fluid is displaced from the second partial interior space 18 into the first partial interior space 17. In doing so, the fluid causes a fluid pressure on the outer seal element 26, which is moved towards the first groove flank 28 and prevents a flow around the main body 23 along the outer circumference, in particular in the region of the main body front part 31. The outer seal element 26 seals the main body 23 against the inner surface 27 of the housing 2.

Due to the fact that the valve element 44 is spring-mounted, as soon as the fluid pressure exerts a force on the valve element 44 that is greater than the spring force of the spring element 47, the valve element 44 is lifted off the valve seat 43. In this case, the overflow channel 39 to 42 is released. A fluid flow 51 from the second partial interior space 18 into the first partial interior space 17 along the overflow channel is possible In the following, a second embodiment example of the invention is described with reference to FIGS. 7 to 12. Constructively identical parts are given the same reference signs as in the first embodiment example, the description of which is hereby referred to. Constructively different but functionally similar parts are given the same reference signs with a trailing letter a.

The essential difference compared to the first embodiment example is that the valve unit 38a of the assembly 22a is designed such that the overflow channel is blocked when actuated in the direction of insertion 52 and released when actuated in the direction of extraction 50. If the overflow channel s blocked when actuated along the first direction, the main body 23 is overflowed by the fluid on its outer surface. Fluid damping, i.e. damping of the displacement movement of the piston-cylinder unit 1a, then does not take place. When the overflow channel is released due to the fluid pressure and the fluid flows through the overflow channel, fluid damping takes place because the overflow channel, at least in sections, has a reduced flow diameter. According to this embodiment example, the direction of insertion 52 corresponds to the first direction and the direction of extraction 50 corresponds to the second direction.

The valve element 44 is arranged at the first passage opening 39 in the assembly 22a. Correspondingly, the valve seat 43a is arranged at the transition region of the spring receiving chamber 41 and the first passage opening 39.

The spring force exerted by the spring element 47 has an effective direction which is oriented along the second direction, i.e. the direction of extraction 50.

As in the first embodiment, the spring element 47 is supported on the end face 49 of the valve element 44. A steel ring 53 inserted into an integrated inner groove on the main body 23a serves for the opposite support.

Due to the inversion of action of the valve unit 38a, the elements 30 are formed on the first groove flank 28 and not on the second groove flank 29.

The outer seal element 26 is designed as an O-ring according to the embodiment example shown.

A further difference compared to the first embodiment example is that the main body 23a is configured in one piece. The main body 23a is in particular made of a plastic material, in particular POM, PEEK and/or PA.

Figure 10:
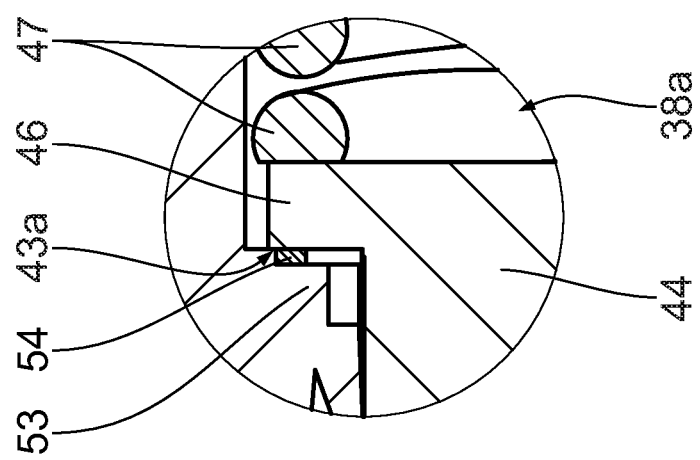
FIG. 10 shows an enlarged detailed illustration of the detail X in FIG. 8.
Figure 11:
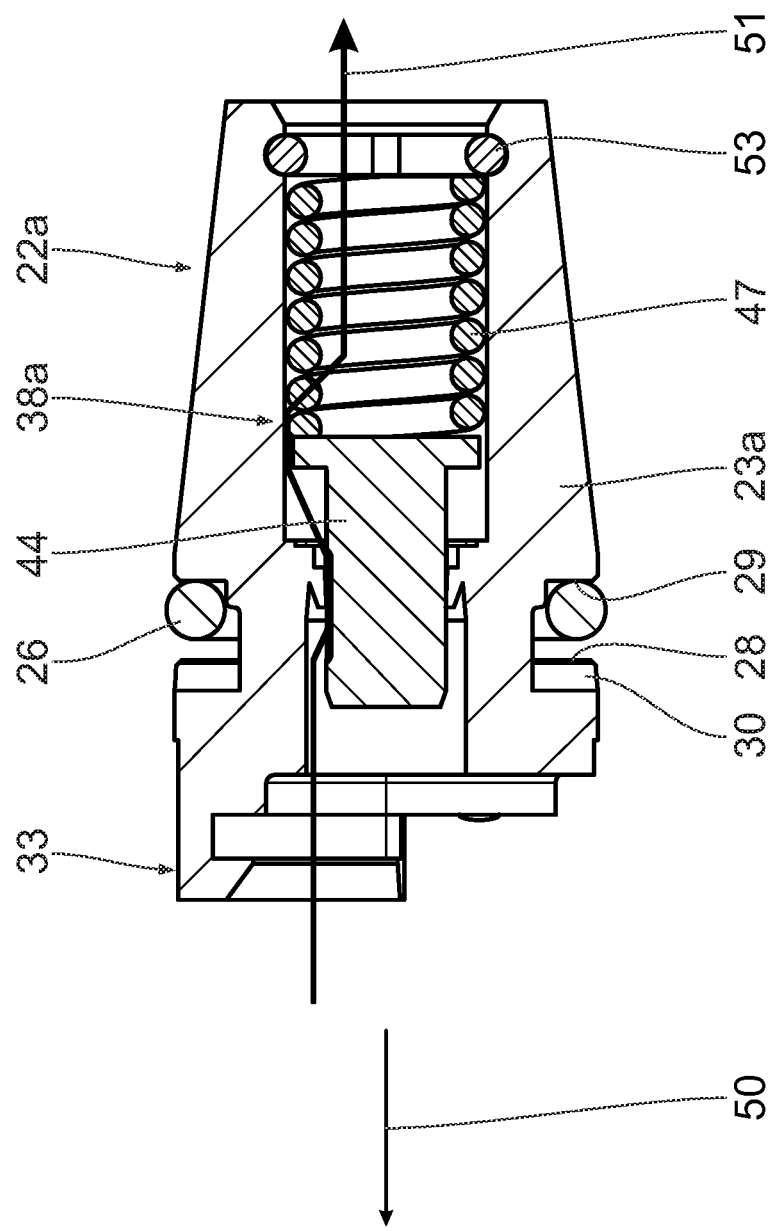
FIG. 11 shows an illustration of the assembly according to FIG. 9 corresponding to FIG. 4 when the piston-cylinder unit is actuated in the direction of extraction.
Figure 12:
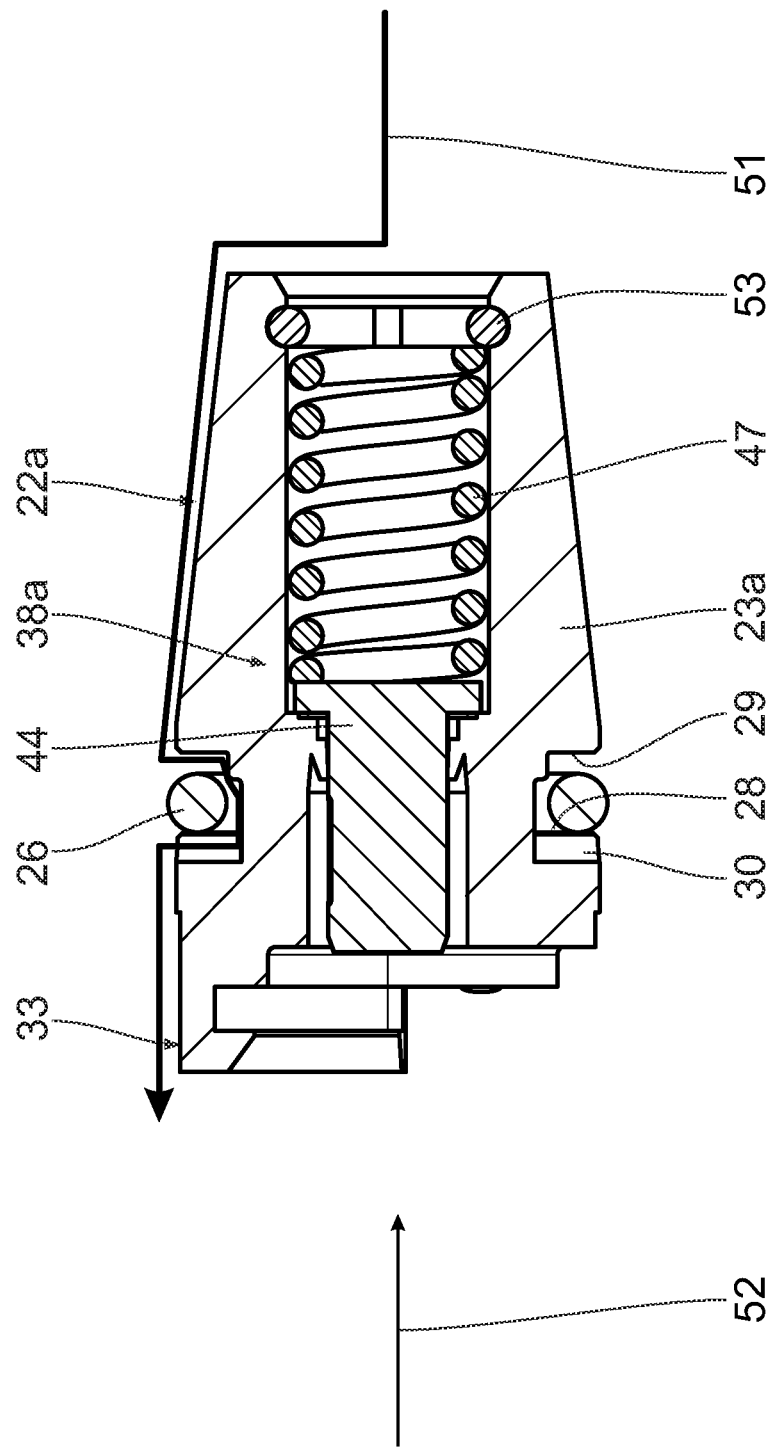
FIG. 12 shows an illustration corresponding to FIG. 11 when the piston-cylinder unit is actuated in the direction of insertion.

The design of the valve seat 43a is explained in more detail with reference to FIG. 10. In the region of an abutment shoulder 56, which surrounds the first passage opening 39, an annular flat seal 54 is inserted on the end face, against which the valve element 44 abuts with the underside of the annular collar 46 in a sealing manner. According to the second embodiment example, the valve seat 43a thus has an additional element with the flat seal 54. The flat seal 54 is made of a sealing material, in particular of an elastomer material, of polytetrafluoroethylene (PTFE) and/or of a plastic composite material having sealing properties.

Figure 13:
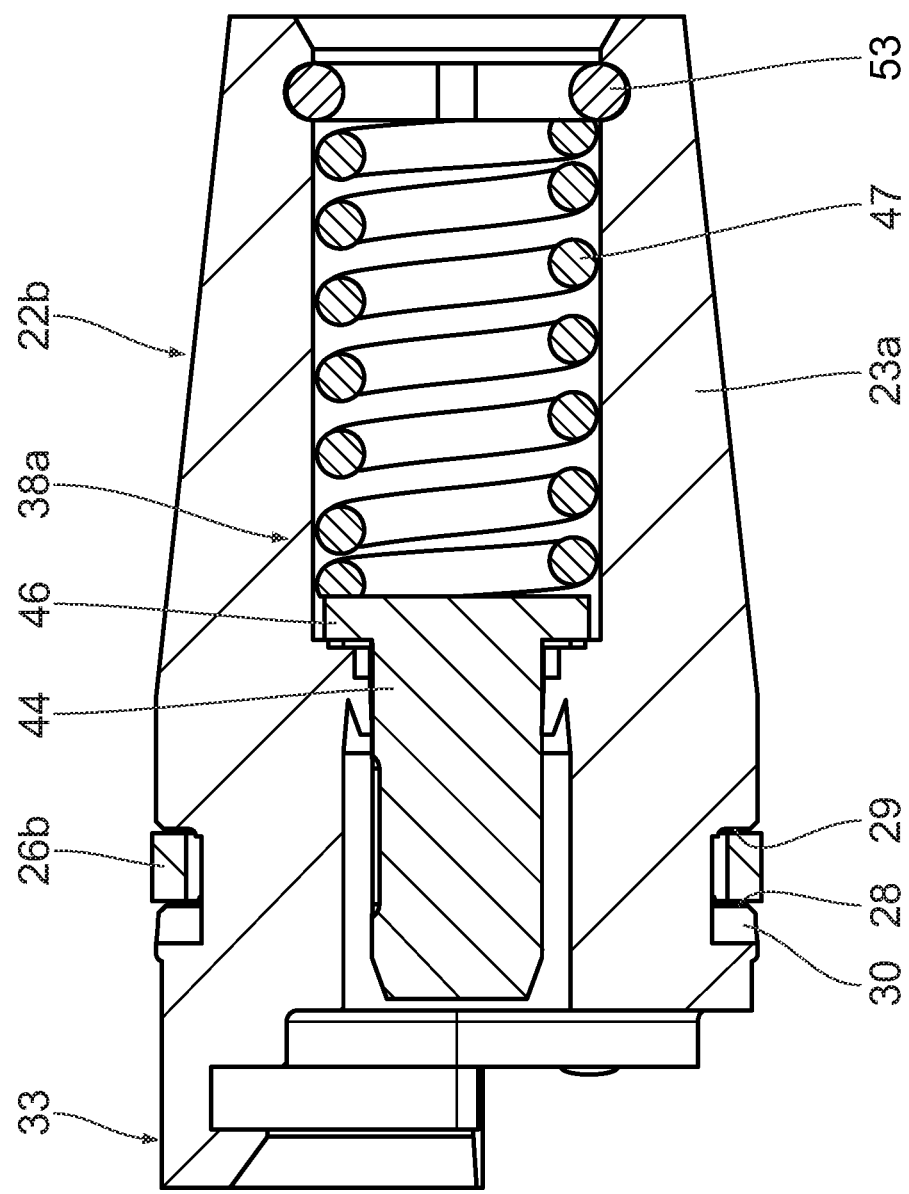
FIG. 13 shows a sectional representation corresponding to FIG. 8 of an assembly of a piston-cylinder unit according to a third embodiment example.

In the following, a third embodiment example of the invention is described with reference to FIG. 13. Constructively identical parts are given the same reference signs as in the two previous embodiment examples, the description of which is hereby referred to. Constructively different but functionally similar parts are given the same reference signs with a trailing letter b.

The assembly 22b corresponds essentially to that according to the second embodiment example, wherein the outer seal element 26b is designed as a piston ring. The valve ring is configured to be more stable compared to the O-ring of the previous embodiment example. The outer seal element 26b is particularly robust.

Figure 14:
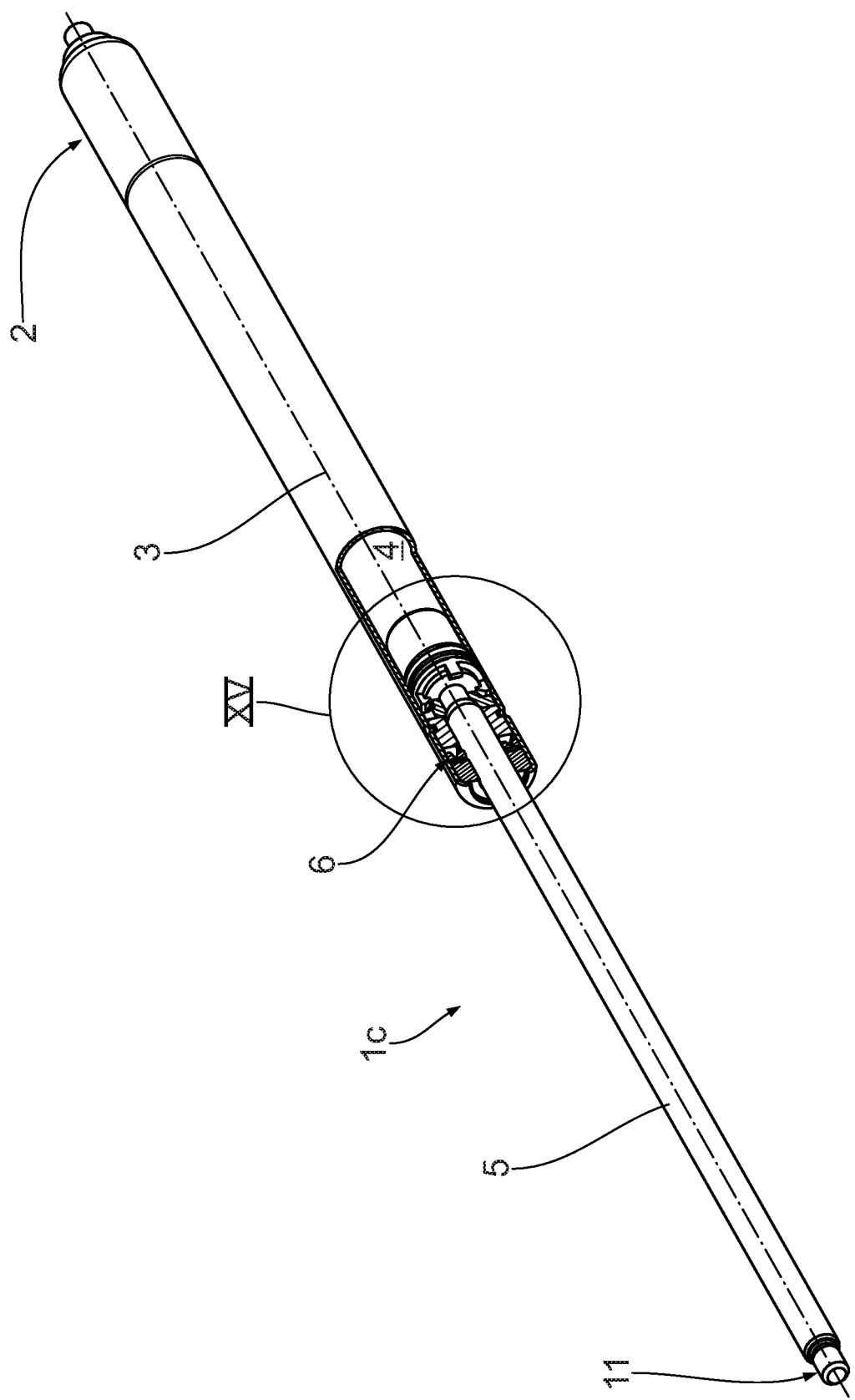
FIG. 14 shows an illustration corresponding to FIG. 1 of a piston-cylinder unit according to a fourth embodiment example.
Figure 15:
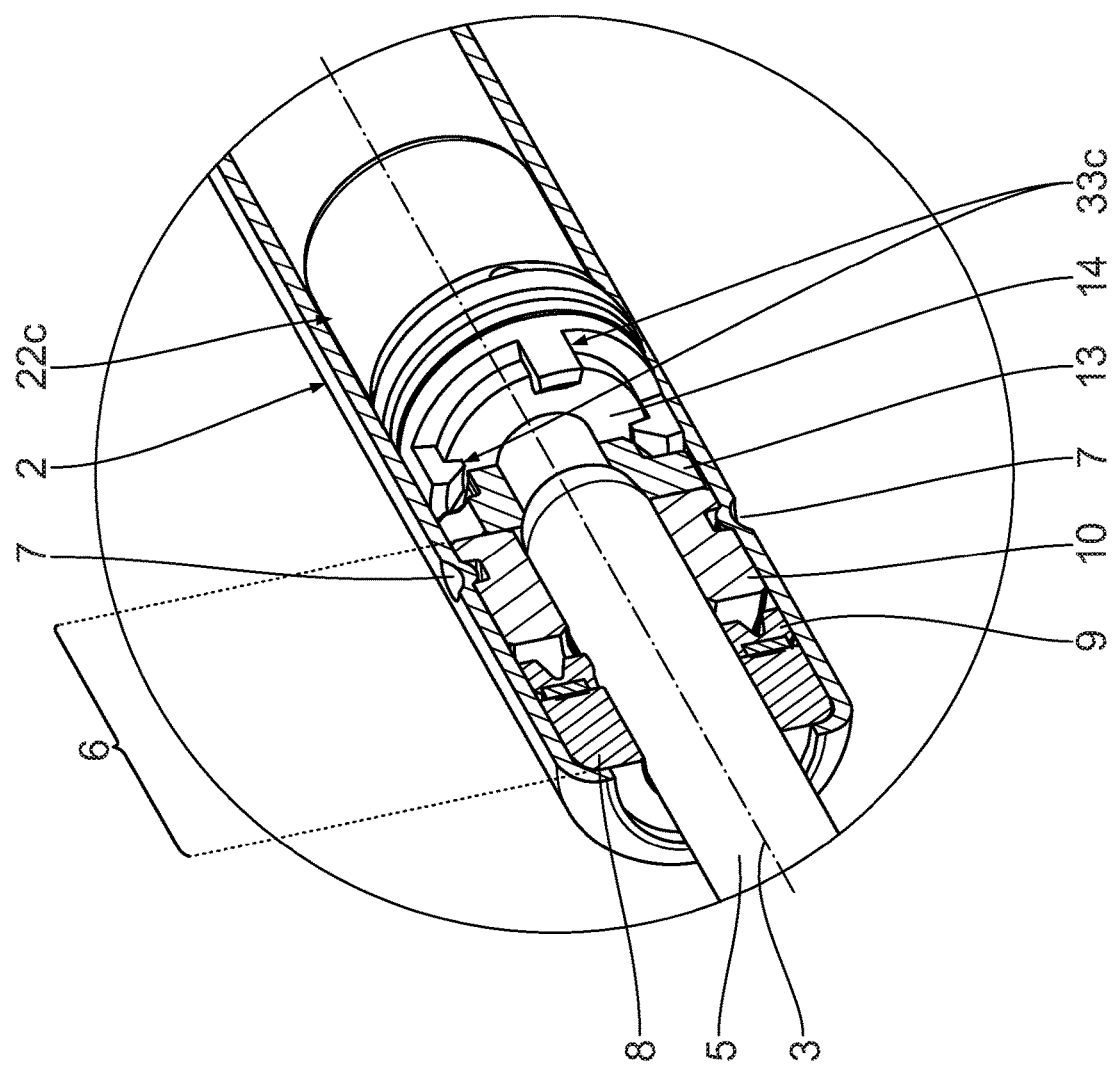
FIG. 15 shows an enlarged detail view of detail XV in FIG. 14.
Figure 16:
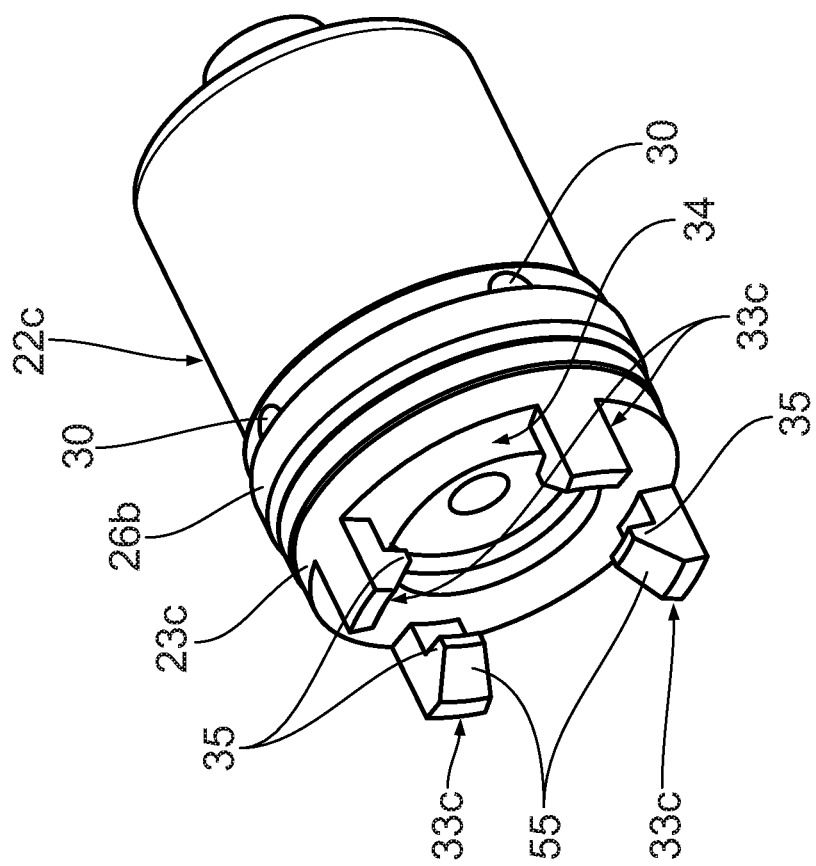
FIG. 16 shows an illustration of the assembly of the piston-cylinder unit according to FIG. 14 corresponding to FIG. 6.

In the following, a fourth embodiment of the invention is described with reference to FIGS. 14 to 16. Constructively identical parts are given the same reference signs as in the previous embodiment examples, the description of which is hereby referred to. Constructively different but functionally similar parts are given the same reference signs with a trailing letter c.

The piston-cylinder unit 1c corresponds essentially to that of the first embodiment, wherein multiple, in particular four, undercut elements are provided, which are arranged spaced apart from one another in the circumferential direction around the assembly longitudinal axis 24 and in particular evenly distributed relative to one another. In the direction around the assembly longitudinal axis 24, two adjacent undercut elements 33c are each arranged with an opening angle of 90° to one another. The individual undercut elements are configured to be hook-shaped. In a longitudinal sectional representation, the undercut elements 33c are essentially identical to the undercut element 33 according to the first embodiment example.

The undercut elements 33c are each configured as snap-on hooks and each have a press-on bevel 55. The press-on bevel 55 is arranged to be inclined with respect to the assembly longitudinal axis 24. Starting from a free end of the undercut elements 33c, which faces the piston rod 5, the press-on bevel 55 is oriented to be inclined inwards in the radial direction and extends up to the hook projection 35 that protrudes radially inwards.

The undercut elements 33c each have an elasticity that allows the snap-on hooks to be elastically deflected radially outwards.

The assembly 22c can be mounted in a particularly uncomplicated manner on the piston rod 5. The piston rod 5 is slid onto the assembly 22c with the piston 13 and the mating element 14 axially along the assembly longitudinal axis 24. When the mating element 14 comes into contact with the undercut elements 33c, in particular with their press-on bevels 55, the undercut elements 33c are deflected radially outwards due to their flexibility. The radial deflection increases the closer the mating element 14 is moved in the direction of the end face 34 of the main body 23c. When the mating element 14 has passed the respective hook projections 35 of the undercut elements 33c and is arranged in the slot 36 formed by the undercut elements 33c, the hook-shaped snap-on hooks snap back into their initial position as shown in FIG. 16 due to their elasticity. The snap-on hooks engage behind the mating element 14 with the hook projections 35. Since there is no press-on bevel provided on the underside of the hook projections 35 facing the mating element 14, it is impossible to pull the assembly 22c off the mating element 14. The assembly 22c is non-detachably connected to the piston rod 5. The assembly 22c is reliably and robustly held on the piston rod 5. The installation is uncomplicated and, in particular, can be carried out in a fully automated manner.

In the following, a fifth embodiment example of the invention is described with reference to FIGS. 17 to 23. Constructively identical parts are given the same reference signs as in the previous embodiment examples, the description of which is hereby referred to. Constructively different but functionally similar parts are given the same reference signs with a trailing letter d.

The main body 23 is manufactured in one piece as a plastic component, in particular from POM, in particular by injection moulding. At its front end facing the mating element 14, the main body 23 has a plurality of snap-on hooks 33d, eight according to the embodiment example shown. The snap-on hooks 33d are each axially formed on a circumferentially closed ring section 57. The individual snap-on hooks 33d extend in the axial direction from the ring section 57.

Adjacent snap-on hooks 33d are separated from each other by an axial gap 66. As a result, the individual snap-on hooks 33d have a structural flexibility that favours snapping the main body 23 onto the mating element 14.

In the region of the snap-on hooks 33d, the main body 23 has an outer diameter $D_a$ which essentially corresponds to an inner diameter $D_i$ of the housing 2 of the piston-cylinder unit 1d. In particular, the following applies: $D_i \geq D_a$, in particular $1.01 \cdot D_a \leq D_i \leq 1.2 \cdot D_a$. Due to the diameter ratios, on the one hand, a collision-free axial displacement of the assembly 22d in the housing 2 is ensured. On the other hand, it is ensured that the main body 23 and thus the assembly 22d as a whole does not accidentally detach from the piston rod 5 or the mating element 14. A radial displacement of the snap-on hooks 33d to the outside which is necessary for this purpose is limited by the inner surface 27 of the housing 2. The main body 23 is held in an interlocking manner on the mating element 14.

The piston rod 5 has a turned shoulder 65 at its end facing the assembly 22d, onto which the mating element 14 is placed. The material projecting axially at the mating element 14 is flanged so that the radially projecting end face collar 16 is formed. The mating element 14 is riveted to the piston rod 5 and in particular to the shoulder 65. The mating element 14 is also referred to as a riveted washer.

At a front end opposite the snap-on hooks 33d, the main body 23 has the second passage opening 42 in which the valve element 44 is arranged. In contrast to the previous embodiment examples, in the embodiment example shown here the sealed arrangement of the valve element 44 is not achieved by means of an axial valve seat, but by means of an integrated sealing lip 58, which is integrally formed on the main body 23. The sealing lip 58 is arranged as a radial projection in the second passage opening 42. In the region of the sealing lip 58, the inner diameter of the passage opening 42 is minimal.

The valve element 44 protrudes from the second passage opening 42 on the main body 23. A cap 59 is fitted to the valve element 44 at its free end and is axially fixed thereto. The cap 59 is axially fixed by a plurality of circumferential beadings 60. The cap 59 is held in an interlocking manner on the valve element 44.

The cap 59 is designed in particular as a hollow rivet or tubular rivet. The cap 59 is in particular made of steel. The cap 59 has a radial collar 61 that faces the main body 23, which radial collar 61 projects in the form of an annular disc in the radial direction relative to the valve element 44.

Figure 18:
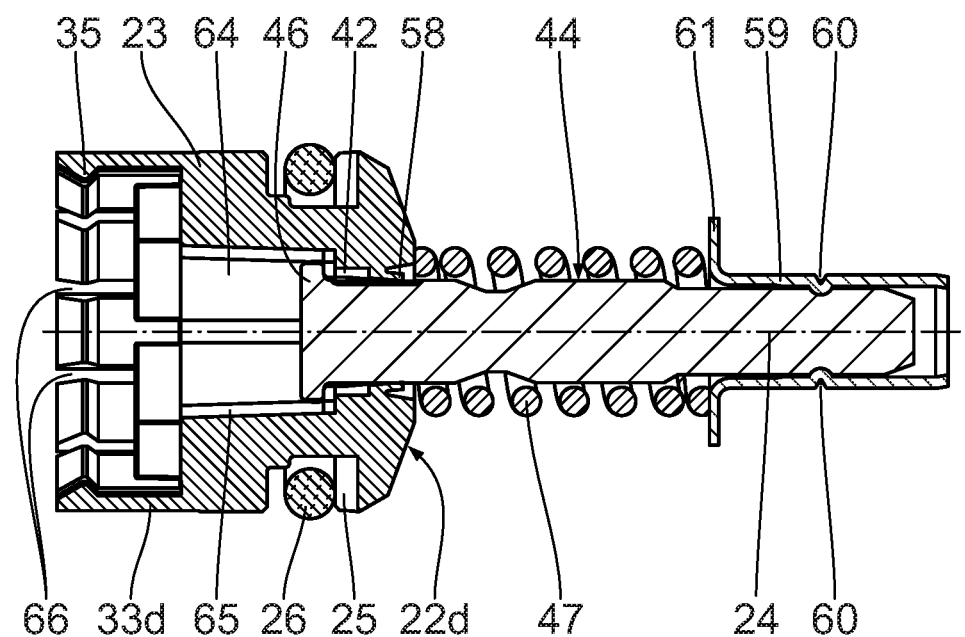
FIG. 18 shows an enlarged sectional representation of the assembly according to FIG. 17.
Figure 19:
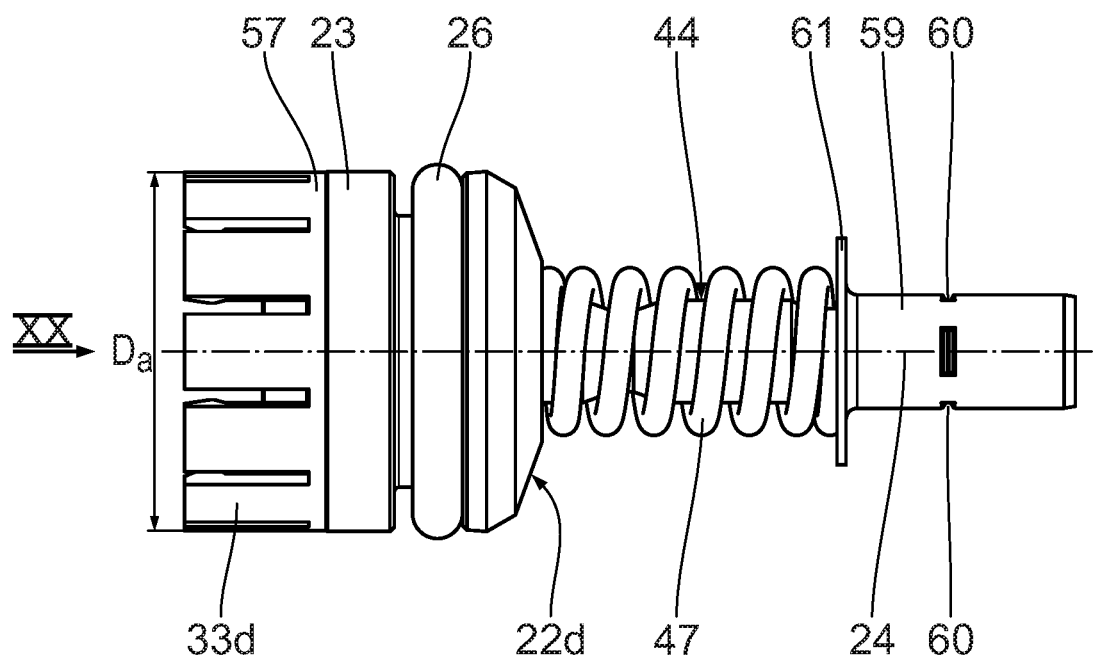
FIG. 19 shows a side view of the assembly in FIG. 18.
Figure 20:
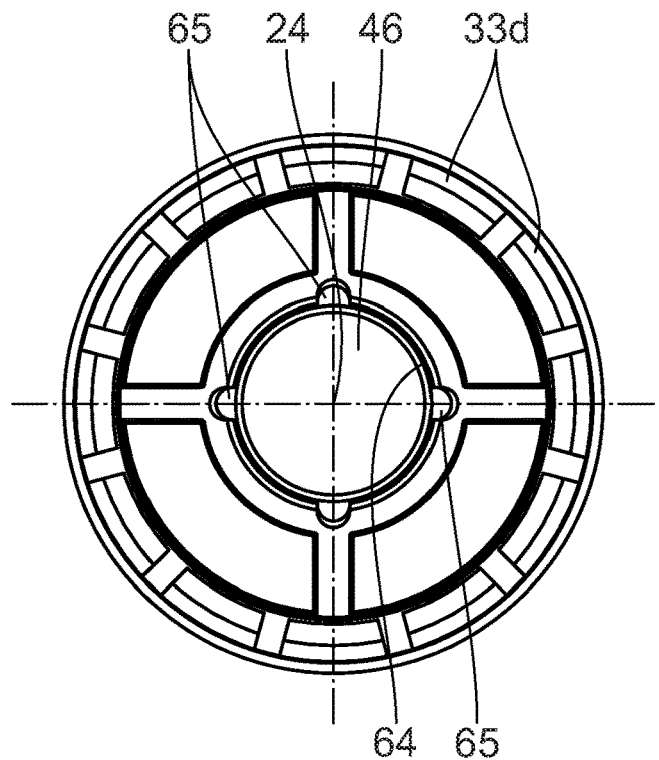
FIG. 20 shows a view according to arrow XX in FIG. 19.
Figure 21:
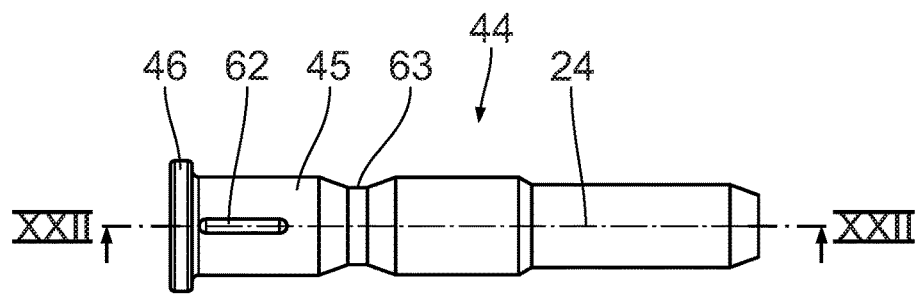
FIG. 21 shows a side view of the valve element of the assembly according to FIG. 18.
Figure 22:
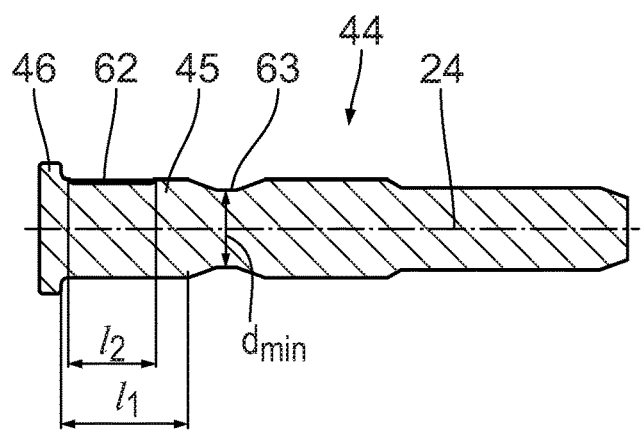
FIG. 22 shows a sectional view according to section line XXII-XXII in FIG. 21.

The radial collar 61 serves as an axial stop for the spring element 47. The spring element 47 is configured as a helical compression spring. The helical compression spring 47 is designed such that it exerts a compressive force on the radial collar 61 of the cap 59, so that the cap 59 and thus the valve element 44 are pressed out of the main body 23. This arrangement is shown in FIG. 18. This arrangement is also referred to as the normal position.

The valve element 44 is configured to be bolt-like with a solid cross-section. The valve element 44 has an axial groove 62. The axial groove 62 extends along the assembly longitudinal axis 24 and is provided as an external groove on the valve element 44, in particular it is milled.

The valve element 44 is made in particular of a metallic material, in particular of an aluminium material, in particular of an aluminium alloy. The valve element 44 is manufactured in particular as a precision turned part. The axial groove is a control groove.

The axial groove 62 is arranged in the longitudinal direction in the region of the end face with which the valve element 44 is arranged within the main body 23. In particular, the axial groove 62 is arranged adjacent to the annular collar 46. In particular, the axial groove 62 is arranged in the region of the cylinder section 45 at the valve element 44. The cylinder section 45 has an outer diameter corresponding for the sake of sealing abutment against the sealing lip 58. In the region of the axial groove 62, the outer diameter of the cylinder section 45 is reduced. In this region, fluid flow is possible, in particular between the sealing lip 58 and the axial groove 62.

The cylinder section 45 has an axial length $l_1$ which is greater than an axial length $l_0$ of the second passage opening 42 in the main body 23. In particular, $l_1 > 1.05 \cdot l_0$, in particular $l_1 > 1.1 \cdot l_0$, in particular $l_1 > 1.2 \cdot l_0$, in particular $l_{01} > 1.5 \cdot l_0$, in particular $l_{01} > 2 \cdot l_0$ and in particular $l_1 < 10 \cdot l_0$.

The axial groove 62 has an axial length $l_2$ which is smaller than or equal to the axial length $l_1$ of the cylinder section 45. In particular, the following applies: $l_2 \leq l_1$, in particular $l_2 < 0.9 \cdot l_1$, in particular $l_2 < 0.8 \cdot l_1$, in particular $l_2 < 0.75 \cdot l_1$, in particular $l_2 < 0.7 \cdot l_1$, in particular $l_2 < 0.6 \cdot l_1$, in particular $l_2 < 0.5 \cdot l_1$, and in particular $l_2 > 0.2 \cdot l_1$.

The axial length $l_2$ of the axial groove 62 is substantially as great as the axial length $l_0$ of the second passage opening 42. In particular, the following applies: $0.8 \cdot l_2 \leq l_0 \leq 1.2 \cdot l_2$, in particular $0.9 \cdot l_{20} \leq l_0 \leq 1.1 \cdot l_2$ and in particular $0.95 \cdot l \leq l_{20} \leq 1.05 \cdot l_2$. It has been found advantageous if the axial length $l_2$ is slightly greater than the axial length $l_0$, in particular $l_2 > l_0$, in particular $l_2 > 1.01 \cdot l_0$ and in particular $l_2 > 1.05 \cdot l_0$.

When the valve element 44 is arranged with the cylinder section 45 but outside the axial groove 62 on the sealing lip 58, the second passage opening 42 is sealed. Fluid flow through the second passage opening 42 is then prevented. The valve element is then in a blockage position.

Along the assembly longitudinal axis 24, a waist section 63 adjoins the cylinder section 45 of the valve element 44. The waist section 63 has a reduced outer diameter $d_{min}$ which is smaller than the minimum inner diameter of the second passage opening 42 determined by the sealing lip 58.

When the valve element 44 is arranged with the waist section 63 in the region of the sealing lip 58, fluid flow through the second passage opening 42 is possible. The valve element 44 is then in an overload position.

The valve element 44 has the annular collar 46, with which the valve element 44 can be moved in an axially guided manner in an axial bore 64 in the main body 23 along the assembly longitudinal axis 24. For this purpose, the axial bore 64 has an inner diameter which essentially corresponds to the outer diameter of the annular collar 46. Multiple axial channels 65 are arranged in the axial direction, four according to the embodiment example shown.

The function of the piston-cylinder unit 1d, which is designed as a gas spring, is explained in more detail below.

If the gas spring 1d is arranged together with an electric drive for actuating a trunk lid on a motor vehicle, in normal operation when the trunk lid is closed, i.e. when the assembly 22d is moved along the first direction 50, the overflow channel will be open, in particular through the second passage opening 42, because the valve element 44 with the axial groove 62 is arranged in the region of the sealing lip 58. The fluid can flow past the valve element 44 through the assembly 22d.

It is conceivable to design the axial groove 62 with a variable groove depth along the longitudinal axis 24. For example, differently stepped groove depths can be designed to produce stepped switching behaviour. Accordingly, different groove widths are also conceivable. In particular, it is also conceivable to design a continuous, in particular linear, degressive or progressive course of the groove depth and/or groove width in order to achieve a correspondingly adapted switching behaviour.

The assembly 22d and in particular the valve element 44 are in the so-called normal position. In particular, the spring element 47 is dimensioned such that the fluid pressure caused during normal operation does not cause any axial displacement of the valve element 44 in the second passage opening 42.

Figure 17:
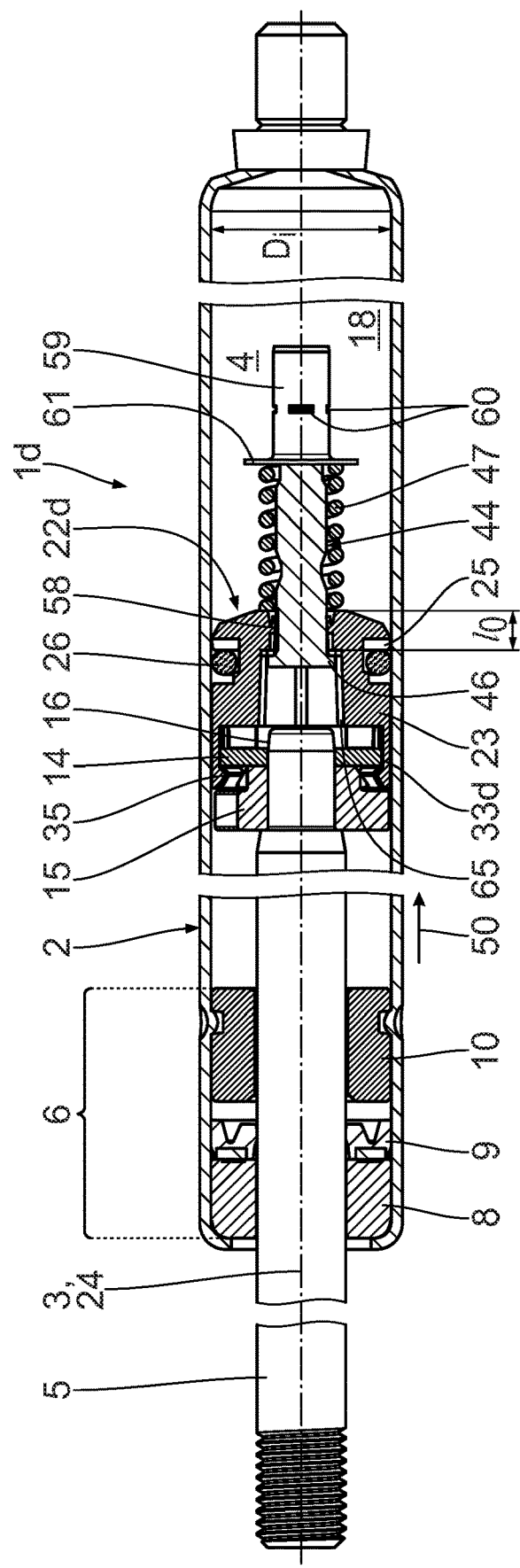
FIG. 17 shows an enlarged longitudinal section of a piston-cylinder unit according to a fifth embodiment example.

In an unintended and in particular unforeseeable case, for example that the electric drive unit fails, an additional mechanical closing force, in particular as a result of the trunk lid's own weight, is exerted on the gas spring 1d along the first direction 50. Due to this increased insertion speed, the internal pressure on the valve element 44 is increased. The valve element 44 is moved to the left, i.e. towards the piston rod 5, as shown in FIG. 17, in particular until the valve element 44 is arranged with the cylinder section 45 outside the axial groove 62 on the sealing lip 58. In this case, the sealing lip 58 abuts in a sealing manner against the valve element 44 on the outer circumference of the cylinder section 45. The valve unit 38 is blocked. The valve element 44 is in a blockage position. The gas spring 1d as a whole is blocked. Unintentional slamming of the trunk lid is prevented. Material damage and destruction and, in particular, health hazards to persons are thus excluded.

If the axial length $l_2$ of the axial groove 62 is the same as the axial length $l_1$ of the cylinder section 45, the valve element 44 is designed without a blockage position. In this case, the valve element 44 is displaced from the normal position described above to the overload position described in the following.

To prevent the trunk lid from remaining in this blocked arrangement, the valve element 44 allows displacement to the overload position. By manual overpressure, i.e. by applying additional external force, and further excess pressure, the valve element 44 is moved further along the first direction 50 into the main body 23 towards the piston rod 5 until the valve element 44 is arranged with the waist section 63 in the second passage opening 42. Due to the fact that the minimum diameter $d_{min}$ is smaller than the minimum inner diameter of the second passage opening 42 determined by the sealing lip 58, fluid flow is possible again. The lid can be closed manually.

It is particularly advantageous with the piston-cylinder unit 1d and in particular the assembly 22d that the various positions of the valve element 44 at the main body 23 can be reversibly adjusted.

FIG. 23 shows the advantageous function of the gas spring 1d. Up to the first limit speed $v_1$ the gas spring 1d behaves like a normal grooved gas spring. This means that an essentially linear increase in force results in dependence on the actuation speed.

In particular, the first speed $v_1$ can be adjusted in a targeted manner. An adjustment is possible, for example, by adapting the depth of the axial groove 62. In addition or alternatively, the first speed $v_1$ can also be adjusted by selecting the helical compression spring, i.e. the spring element 47, i.e. by the spring preload. When the first speed $v_1$ is exceeded, the valve element 44 is moved into the blocking position. If the speed is increased further, the valve element 44 is moved into the overload region, i.e. with the waist section 63 arranged in the second passage opening 42.

This can be seen in the diagram in FIG. 23 by the fact that even with a further increase in speed, i.e. at speeds above the second speed $v_2$, there is no further, in particular no further significant increase in force.

This function of the gas spring 1d ensures that the damping force is comparatively low in a predefinable application speed range. In the event of an unintentional failure case, the actuation speed can therefore increase significantly so that the gas spring 1d has a significantly increased actuation force and can thus dissipate or convert increased energy. The gas spring 1d is fail-safe and reliable. Incorrect operation is virtually excluded.

The invention claimed is:

1. An assembly for a fluid-filled piston-cylinder unit, the assembly comprising:
   a. a main body having an assembly longitudinal axis,
   b. a valve unit integrated in the main body, wherein said valve unit i. has an overflow channel,
  ii. seals the overflow channel when the assembly is moved along the assembly longitudinal axis in a first direction,
  iii. releases the overflow channel, in dependence on the fluid pressure, when the assembly is moved along the assembly longitudinal axis in a second direction,
 c. an outer seal element that is arranged on the main body so as to be moved along the assembly longitudinal axis, for abutting in a sealing manner against an inner surface of the housing,
 d. at least one undercut element formed on the main body for engaging in an interlocking manner behind a mating element of the piston-cylinder unit, wherein the overflow channel has at least one transverse channel which extends at least in sections transversely to the assembly longitudinal axis on an end face of the main body that faces the at least one undercut element.

2. An assembly according to claim 1, wherein the valve unit has a valve element which is movable along the assembly longitudinal axis and abuts in a sealing manner against a valve seat in order to seal the overflow channel.

3. An assembly according to claim 2, wherein the valve element is pressed against the valve seat by means of a spring element.

4. An assembly according to claim 1, wherein the main body is configured in two parts with a main body front part and a main body rear part which can be connected thereto.

5. An assembly according to claim 4, wherein the main body rear part is detachably connected to the main body front part.

6. An assembly according to claim 4, wherein the main body rear part is to be screwable to the main body front part.

7. An assembly according to claim 4, wherein the at least one undercut element is arranged on the main body front part.

8. An assembly according to claim 1, wherein the at least one undercut element is arranged on an end face of the main body.

9. An assembly according to claim 1, wherein the at least one undercut element is configured as a snap-on hook which is designed to snap axially onto the mating element.

10. An assembly according to claim 9, wherein the snap-on hook has a press-on bevel.

11. An assembly according to claim 1, wherein the at least one undercut element defines a slot into which the mating element of the piston-cylinder unit is insertable.

12. An assembly according to claim 1, wherein the valve unit, when the assembly is moved along the assembly longitudinal axis in the second direction, is bringable into an overload position in which the overflow channel is released.

13. An assembly according to claim 1, wherein the overflow channel has at least one axial recess extending along the assembly longitudinal axis on an end face of the main body that faces the at least one undercut element.

14. An assembly according to claim 1, wherein the overflow channel has a passage opening integrated in the main body.

15. An assembly according to claim 14, wherein the passage opening extends up to an end face of the main body that faces the at least one undercut element.

16. An assembly according to claim 1, further comprising another undercut element to provide a plurality of undercut elements, the plurality of undercut elements being arranged distributed in a circumferential direction around the assembly longitudinal axis.

17. An assembly according to claim 16, wherein each of the undercut elements comprises a mating element contact surface configured to contact the mating element, the mating element contact surface of each of the undercut elements being located in the plane perpendicular to the assembly longitudinal axis.

18. A fluid-filled piston-cylinder unit comprising
 a. a cylindrical housing having a housing longitudinal axis and an interior space,
 b. a piston rod which is guided out of the housing in a sealed manner and is moveable along the housing longitudinal axis,
 c. a piston which is fastened to the piston rod and which divides the interior space into a first partial interior space and a second partial interior space, wherein the partial interior spaces can be connected to one another fluidically via an overflow channel,
 d. an assembly comprising
   a main body having an assembly longitudinal axis,
   a valve unit integrated in the main body, said valve unit
   i. having the overflow channel,
   ii. sealing the overflow channel when the assembly is moved along the assembly longitudinal axis in a first direction,
   iii. releasing the overflow channel, in dependence on the fluid pressure, when the assembly is moved along the assembly longitudinal axis in a second direction,
   an outer seal element that is arranged on the main body so as to be moved along the assembly longitudinal axis, for abutting in a sealing manner against an inner surface of the housing,
   at least one undercut element formed on the main body for engaging in an interlocking manner behind a mating element of the piston-cylinder unit, wherein the assembly is held in a form-fit manner on the piston rod along the housing longitudinal axis.

19. A piston-cylinder unit according to claim 18, wherein the assembly is mounted on the mating element one of by sliding on along the housing longitudinal axis and to the housing longitudinal axis.

20. A piston-cylinder unit according to claim 18, wherein the assembly is one of detachably and non-detachably connected to the piston rod.

* * * * *